(12) United States Patent
Yamaguchi et al.

(10) Patent No.: US 8,321,863 B2
(45) Date of Patent: Nov. 27, 2012

(54) SECURITY MANAGEMENT DEVICE AND METHOD

(75) Inventors: Akihiko Yamaguchi, Tokyo (JP); Nobuo Beniyama, Tokyo (JP); Atsushi Hatakeyama, Tokyo (JP); Kota Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 647 days.

(21) Appl. No.: 12/521,540

(22) PCT Filed: Mar. 6, 2009

(86) PCT No.: PCT/JP2009/054827
§ 371 (c)(1),
(2), (4) Date: Jun. 26, 2009

(87) PCT Pub. No.: WO2010/100769
PCT Pub. Date: Sep. 10, 2010

(65) Prior Publication Data
US 2011/0047541 A1 Feb. 24, 2011

(51) Int. Cl.
G06F 9/455 (2006.01)
G06F 9/46 (2006.01)
G06F 9/44 (2006.01)
G06F 9/445 (2006.01)
G06F 17/00 (2006.01)

(52) U.S. Cl. ............ 718/1; 718/100; 717/170; 717/172; 717/177; 726/1

(58) Field of Classification Search .................. None
See application file for complete search history.

(56) References Cited

U.S. PATENT DOCUMENTS

| | | | |
|---|---|---|---|
| 2006/0184937 A1 | 8/2006 | Abels et al. | |
| 2006/0230407 A1* | 10/2006 | Rosu et al. | 718/105 |
| 2008/0134175 A1* | 6/2008 | Fitzgerald et al. | 718/1 |
| 2009/0007105 A1* | 1/2009 | Fries et al. | 718/1 |
| 2009/0089860 A1* | 4/2009 | Forrester et al. | 726/3 |
| 2009/0100420 A1* | 4/2009 | Sapuntzakis et al. | 717/171 |
| 2009/0198731 A1* | 8/2009 | Noonan, III | 707/104.1 |
| 2009/0292737 A1* | 11/2009 | Hayton | 707/200 |
| 2010/0071035 A1* | 3/2010 | Budko et al. | 726/4 |
| 2010/0287544 A1* | 11/2010 | Bradfield et al. | 717/172 |

FOREIGN PATENT DOCUMENTS

JP 6-230957 8/1994
(Continued)

OTHER PUBLICATIONS

PCT International Search Report on Application No. PCT/JP2009/054827 dated Apr. 21, 2009; 3 pages.

(Continued)

*Primary Examiner* — Meng An
*Assistant Examiner* — Abdullah Al Kawsar
(74) *Attorney, Agent, or Firm* — Foley & Lardner LLP

(57) ABSTRACT

In a case where a master virtual machine, which is constructed on the basis of master information for configuring either part or all of a virtual machine, and an individual virtual machine, which is constructed on the basis of individual information that is configured partially or entirely in accordance with the master information, exist as the types of virtual machines that a physical client provides to a user terminal, a security check of a plurality of virtual machines is selectively executed, with respect to each check item, for a virtual machine of the type corresponding to the contents of the check item.

20 Claims, 33 Drawing Sheets

| CHECK ITEM | ID | DETAILS | CHECK TARGET | PRIORITY | CHECK PERIOD |
|---|---|---|---|---|---|
| UPDATE PROGRAM | C1-01 | PATCH A | MASTER | HIGH | 1 DAY |
| | C1-02 | PATCH B | MASTER | MEDIUM | 7 DAYS |
| | ... | ... | ... | ... | ... |
| ANTI-VIRUS PRODUCT | C2 | VIRUS CHECKER A, 1.0, 2008/1/1, ... | MASTER OR INDIVIDUAL | HIGH | 1 DAY |
| | | VIRUS CHECKER B, 1.0, 2008/1/1, ... | | | |
| | | ... | | | |
| UNAUTHORIZED SOFTWARE | C3-01 | SOFTWARE X, 2.0 | INDIVIDUAL | MEDIUM | 1 DAY |
| | C3-02 | SOFTWARE Y, ALL VERSIONS | MASTER OR INDIVIDUAL | HIGH | 1 DAY |
| | ... | ... | ... | ... | ... |
| COMPULSORY SOFTWARE | C4-01 | SOFTWARE A, 6.0 | MASTER | LOW | 14 DAYS |
| | C4-02 | SOFTWARE B, 5.0 | MASTER | HIGH | 1 DAY |
| | ... | ... | ... | ... | ... |
| SECURITY SETTINGS | C5-01 | PASSWORD-CONTROLLED SCREENSAVER SETTING | INDIVIDUAL | LOW | 30 DAYS |
| | C5-02 | LOGIN PASSWORD VULNERABILITY | INDIVIDUAL | MEDIUM | 7 DAYS |
| | ... | ... | ... | ... | ... |

220A  220B  220C  220D  220E  220F  220

FOREIGN PATENT DOCUMENTS

| | | |
|---|---|---|
| JP | 2003-296132 | 10/2003 |
| JP | 2006-221649 | 8/2006 |
| JP | 2006-221649 A | 8/2006 |
| JP | 2006-235692 | 9/2006 |
| JP | 2006-244373 | 9/2006 |
| JP | 2007-66265 A | 3/2007 |
| JP | 2008-027322 | 2/2008 |

OTHER PUBLICATIONS

Linked Clone® technology of Vmware®, inc., Vmware View3 (brochure) vmware.com/files/pdf/view_brochure.pdf, 2008.

FlexClone® technology of NetApp®, inc., FlexClone (data sheet) media.netapp.com/documents/ds-2837-0808-flexclone.pdf, Aug. 2008.

* cited by examiner

FIG.3

| CHECK ITEM | ID | DETAILS | CHECK TARGET | PRIORITY | CHECK PERIOD |
|---|---|---|---|---|---|
| UPDATE PROGRAM | C1-01 | PATCH A | MASTER | HIGH | 1 DAY |
| | C1-02 | PATCH B | MASTER | MEDIUM | 7 DAYS |
| | ... | ... | ... | ... | ... |
| ANTI-VIRUS PRODUCT | C2 | VIRUS CHECKER A, 1.0, 2008/1/1, ... <br> VIRUS CHECKER B, 1.0, 2008/1/1, ... | MASTER OR INDIVIDUAL | HIGH | 1 DAY |
| UNAUTHORIZED SOFTWARE | C3-01 | SOFTWARE X, 2.0 | INDIVIDUAL | MEDIUM | 1 DAY |
| | C3-02 | SOFTWARE Y, ALL VERSIONS | MASTER OR INDIVIDUAL | HIGH | 1 DAY |
| | ... | ... | ... | ... | ... |
| COMPULSORY SOFTWARE | C4-01 | SOFTWARE A, 6.0 | MASTER | LOW | 14 DAYS |
| | C4-02 | SOFTWARE B, 5.0 | MASTER | HIGH | 1 DAY |
| | ... | ... | ... | ... | ... |
| SECURITY SETTINGS | C5-01 | PASSWORD-CONTROLLED SCREENSAVER SETTING | INDIVIDUAL | LOW | 30 DAYS |
| | C5-02 | LOGIN PASSWORD VULNERABILITY | INDIVIDUAL | MEDIUM | 7 DAYS |
| | ... | ... | ... | ... | ... |
| 220A | 220B | 220C | 220D | 220E | 220F |

| INDIVIDUAL VM | MASTER VM |
|---|---|
| VM2 | VM1 |
| VM3 | VM1 |
| VM4 | VM1 |

| CID | MACHINE ID | C1-01 | C1-02 | C2 | ... | C3-01 | C3-02 | ... | C4-01 | C4-02 | ... | C5-01 | C5-02 | ... |
|---|---|---|---|---|---|---|---|---|---|---|---|---|---|---|
| 001 | VM1 | ○ | ○ | ○ |  | ○ | ○ |  | ○ | — |  | — | — |  |
| 001 | VM2 | ○ | ○ | ○ |  | ○ | ○ |  | ○ | ○ |  | ○ | ○ |  |
| 001 | VM3 | ○ | ○ | ○ |  | ○ | ○ |  | ○ | ○ |  | ○ | ○ |  |
| 001 | VM4 | ○ | ○ | ○ |  | — | ○ |  | ○ | ○ |  | × | ○ |  |
| 002 | VM1 | ○ | ○ | ○ |  | — | PENDING |  | PENDING | ○ |  | — | — |  |
| 002 | VM2 | ○ | ○ | ○ |  | PENDING | PENDING |  | PENDING | ○ |  | PENDING | PENDING |  |
| 002 | VM3 | ○ | ○ | ○ |  | PENDING | PENDING |  | PENDING | ○ |  | PENDING | PENDING |  |
| 002 | VM4 | ○ | ○ | ○ |  | PENDING | PENDING |  | PENDING | ○ |  | PENDING | PENDING |  |

FIG.6

| MACHINE ID | IP ADDRESS | CORRESPONDING PHYSICAL MACHINE ID | RESOURCE INFORMATION | | | |
|---|---|---|---|---|---|---|
| | | | CPU | MEMORY | DISK | ... |
| VM1 | 10.1.1.1 | PM1 | 2GHz | 1GB | 20GB | ... |
| VM2 | 10.1.1.2 | PM1 | 2GHz | 1GB | 20GB | ... |
| VM3 | 10.1.1.3 | PM1 | 2GHz | 1GB | 20GB | ... |
| VM4 | 10.1.1.4 | PM1 | 2GHz | 1GB | 20GB | ... |

| MACHINE ID | IP ADDRESS | CORRESPONDING PHYSICAL MACHINE ID | STATUS | RESOURCE INFORMATION | | | |
|---|---|---|---|---|---|---|---|
| | | | | CPU | MEMORY | DISK | |
| VM1 | 10.1.1.1 | PM1 | RUNNING | 2GHz | 1GB | 20GB | ... |
| VM2 | 10.1.1.2 | PM1 | RUNNING | 2GHz | 1GB | 20GB | ... |
| VM3 | 10.1.1.3 | PM1 | RUNNING | 2GHz | 1GB | 20GB | ... |
| VM4 | 10.1.1.4 | PM1 | SUSPENDED | 2GHz | 1GB | 20GB | ... |

FIG.10

| MACHINE ID | IP ADDRESS | RESOURCE INFORMATION | | | |
|---|---|---|---|---|---|
| | | CPU INFORMATION | MEMORY INFORMATION | DISK INFORMATION | ... |
| PM1 | 10.1.1.101 | 12GHz(3GHz × 4) | 8GB | 100GB | ... |
| PM2 | 10.1.1.102 | 12GHz(3GHz × 4) | 8GB | 100GB | ... |

421A: MACHINE ID
421B: IP ADDRESS
421C: RESOURCE INFORMATION
421CA: CPU INFORMATION
421CB: MEMORY INFORMATION
421CC: DISK INFORMATION
421

FIG.14

CHECK POLICY SETTINGS — 500

■ UPDATE PROGRAM DETERMINATION  ● ON ○ OFF — 501A — 501

| UPDATE PROGRAM | CHECK TARGET | PRIORITY | CHECK PERIOD |
|---|---|---|---|
| PATCH A | MASTER | HIGH | 1 DAY |
| PATCH B | MASTER | MEDIUM | 7 DAYS |

■ ANTI-VIRUS PRODUCT DETERMINATION  ● ON ○ OFF — 502A — 502

·AUTHORIZED PRODUCTS

| ANTI-VIRUS PRODUCT | VERSION | VIRUS DEFINITIONS | ... |
|---|---|---|---|
| VIRUS CHECKER A | 1.0 | 2008/1/1 | |
| VIRUS CHECKER B | 1.0 | 2008/1/1 | |

·CHECK POLICY

| CHECK TARGET | PRIORITY | CHECK PERIOD |
|---|---|---|
| MASTER OR INDIVIDUAL | HIGH | 1 DAY |

■ UNAUTHORIZED SOFTWARE DETERMINATION  ● ON ○ OFF — 503A — 503

| UNAUTHORIZED SOFTWARE | VERSION | CHECK TARGET | PRIORITY | CHECK PERIOD |
|---|---|---|---|---|
| SOFTWARE X | 2.0 | INDIVIDUAL | MEDIUM | 1 DAY |
| SOFTWARE Y | | MASTER AND INDIVIDUAL | HIGH | 1 DAY |

■ COMPULSORY SOFTWARE DETERMINATION  ● ON ○ OFF — 504A — 504

| COMPULSORY SOFTWARE | VERSION | CHECK TARGET | PRIORITY | CHECK PERIOD |
|---|---|---|---|---|
| SOFTWARE A | 6.0 | MASTER | LOW | 14 DAYS |
| SOFTWARE B | 5.0 | MASTER | HIGH | 1 DAYS |

■ SECURITY SETTING DETERMINATION — 505

| CHECK ITEM | CHECK YES/NO | CHECK TARGET | PRIORITY | CHECK PERIOD |
|---|---|---|---|---|
| PASSWORD-CONTROLLED SCREENSAVER SETTING | YES | INDIVIDUAL | LOW | 30 DAYS |
| LOGIN PASSWORD VULNERABILITY | YES | INDIVIDUAL | MEDIUM | 7 DAYS |
| PERMANENT PASSWORD SETTING PROHIBITED | NO | — | — | — |

[ OK ] — 506    [ CANCEL ] — 507

FIG.22

| CHECK ITEM | ID | DETAILS | CHECK TARGET | PRIORITY | CHECK PERIOD |
|---|---|---|---|---|---|
| UPDATE PROGRAM | C1-01 | PATCH A | MASTER | HIGH | 1 DAY |
|  | C1-02 | PATCH B | MASTER | MEDIUM | 7 DAYS |
|  | ... | ... | ... | ... | ... |
| ANTI-VIRUS PRODUCT | C2 | VIRUS CHECKER A, 1.0, 2008/1/1, ... VIRUS CHECKER B, 1.0, 2008/1/1, ... | MASTER AND INDIVIDUAL | HIGH | 1 DAY |
| UNAUTHORIZED SOFTWARE | C3-01 | SOFTWARE X, 2.0 | INDIVIDUAL | MEDIUM | 1 DAY |
|  | C3-02 | SOFTWARE Y, ALL VERSIONS | MASTER AND INDIVIDUAL | HIGH | 1 DAY |
|  | ... | ... | ... | ... | ... |
| COMPULSORY SOFTWARE | C4-01 | SOFTWARE A, 6.0 | MASTER | LOW | 14 DAYS |
|  | C4-02 | SOFTWARE B, 5.0 | MASTER | HIGH | 1 DAY |
|  | ... | ... | ... | ... | ... |
| SECURITY SETTINGS | C5-01 | PASSWORD-CONTROLLED SCREENSAVER SETTING | INDIVIDUAL | LOW | 30 DAYS |
|  | C5-02 | LOGIN PASSWORD VULNERABILITY | INDIVIDUAL | MEDIUM | 7 DAYS |
|  | ... | ... | ... | ... | ... |
| REFLECT MASTER CHANGE | C6 |  | INDIVIDUAL | HIGH | 1 DAY |

CHECK POLICY SETTINGS — 1100

■ UPDATE PROGRAM DETERMINATION  ● ON ○ OFF — 501A

| UPDATE PROGRAM | CHECK TARGET | PRIORITY | CHECK PERIOD |
|---|---|---|---|
| PATCH A | AUTOMATIC | HIGH | 1 DAY |
| PATCH B | AUTOMATIC | MEDIUM | 7 DAYS |

— 501

■ ANTI-VIRUS PRODUCT DETERMINATION AUTHORIZED PRODUCTS  ● ON ○ OFF — 502A

| ANTI-VIRUS PRODUCT | VERSION | VIRUS DEFINITIONS | ... |
|---|---|---|---|
| VIRUS CHECKER A | 1.0 | 2008/1/1 | |
| VIRUS CHECKER B | 1.0 | 2008/1/1 | |

・CHECK POLICY

| CHECK TARGET | PRIORITY | CHECK PERIOD |
|---|---|---|
| AUTOMATIC | HIGH | 1 DAY |

— 502

■ UNAUTHORIZED SOFTWARE DETERMINATION  ● ON ○ OFF — 503A

| UNAUTHORIZED SOFTWARE | VERSION | CHECK TARGET | PRIORITY | CHECK PERIOD |
|---|---|---|---|---|
| SOFTWARE X | 2.0 | AUTOMATIC | HIGH | 1 DAY |
| SOFTWARE Y | | AUTOMATIC | MEDIUM | 1 DAY |

— 503

■ COMPULSORY SOFTWARE DETERMINATION  ● ON ○ OFF — 504A

| COMPULSORY SOFTWARE | VERSION | CHECK TARGET | PRIORITY | CHECK PERIOD |
|---|---|---|---|---|
| SOFTWARE A | 6.0 | AUTOMATIC | LOW | 14 DAYS |
| SOFTWARE B | 5.0 | AUTOMATIC | HIGH | 1 DAY |

— 504

■ SECURITY SETTING DETERMINATION

| CHECK ITEM | CHECK YES/NO | CHECK TARGET | PRIORITY | CHECK PERIOD |
|---|---|---|---|---|
| PASSWORD-CONTROLLED SCREENSAVER SETTING | YES | AUTOMATIC | LOW | 30 DAYS |
| LOGIN PASSWORD VULNERABILITY | YES | AUTOMATIC | MEDIUM | 7 DAYS |
| PERMANENT PASSWORD SETTING PROHIBITED | NO | — | — | — |

— 505

[ OK ] — 506     [ CANCEL ] — 507

FIG.32

| MACHINE ID | C1-01 | C1-02 | ... | C2 | ... | C3-01 | C3-02 | ... | C4-01 | C4-02 | ... | C5-01 | C5-02 | ... |
|---|---|---|---|---|---|---|---|---|---|---|---|---|---|---|
| VM1 | MASTER | MASTER | | MASTER | | INDIVIDUAL | INDIVIDUAL | | MASTER | MASTER | | INDIVIDUAL | INDIVIDUAL | |
| VMx | MASTER | MASTER | | MASTER | | MASTER | MASTER | | MASTER | MASTER | | INDIVIDUAL | INDIVIDUAL | |
| VMy | MASTER | MASTER | | INDIVIDUAL | | INDIVIDUAL | INDIVIDUAL | | INDIVIDUAL | INDIVIDUAL | | INDIVIDUAL | INDIVIDUAL | |

…

SECURITY MANAGEMENT DEVICE AND METHOD

CROSS REFERENCES

This application relates to the national phase patent application of Japanese PCT Application No. PCT/JP2009/054827, filed on Mar. 6, 2009 and claims priority from this of this PCT Application, the entire disclosure of which is incorporated herein by reference.

TECHNICAL FIELD

The present invention relates to a security management device and method, and more particularly preferably suits to a security management server for executing a security check for a plurality of virtual clients in a network system in which the plurality of virtual clients have a common configuration.

BACKGROUND ART

With enactment of the SOX Act, companies are being required to strengthen security measures to bring their operations into compliance with this law. Security management has become important even for the client terminals used by individuals in a company, and there is an increasing need for constant awareness and monitoring of the latest security situation regarding client terminals (simply referred to as client hereinafter) connected to a network.

Conventional techniques for meeting this need, for example, include a method for auditing the security situation of a network-connected client disclosed in Japanese Patent Application Laid-open No. 2007-66265 (referred to as Patent Document 1). Also, software for checking whether or not the assets (installed software and patches) of each client connected to a network are secure, totaling the results of the check and notifying the administrator have been released by various vendors.

Meanwhile, from the standpoint of reducing TCO and improving operations management, virtualization technology, which uses software to emulate a computer, thereby providing a virtual computer environment, that is, a virtual machine, has come into widespread use. Utilizing virtualization technology makes it possible to share a machine image of a virtual machine between a plurality of virtual machines. In accordance with this, only the difference data between the shared machine images needs to be managed for each virtual machine.

Virtualization technology such as this, for example, is disclosed in Patent Document 1 and Japanese Patent Application Laid-open No. 2006-221649 (called Patent Document 2 hereinafter), and, various vendors have also released products that make use of this virtualization technology, such as Linked Clone technology by VMware (registered trademark) (refer to the VMware (registered trademark) View 3 brochure (called Non-Patent Document 1 hereinafter)), and FlexClone (registered trademark) technology by NetApp (registered trademark) (refer to the NetApp (registered trademark) FlexClone (registered trademark) Datasheet (referred to as Non-Patent Document 2 hereinafter)). Further, technology for migrating a virtual machine from one physical machine to another physical machine, for example, has also been disclosed in Japanese Patent Application Laid-open No. 2007-66265.

In a large-scale network environment, the number of clients targeted by a security check is enormous, and therefore carrying out a security check of all the clients requires a long period of time, making it difficult to grasp the latest security situation of each client.

Further, the increase in the number of virtual machines in line with the spread of virtualization technology in recent years is expected to significantly increase the number of management-targeted clients, most likely making it increasingly difficult in the future to discern the latest security situation of each virtual machine in a large-scale network environment. For this reason, security checks of network environments like this will have to be carried out faster.

DISCLOSURE OF THE INVENTION

With the foregoing in view, an object of the present invention is to propose a security management device and method that makes it possible to carry out a security check faster and more efficiently.

To solve this problem, in the present invention, a security management device for managing the security of a plurality of virtual machines, which is a virtual computer environment that a physical client provides to a user terminal, comprises a storage device for storing a check policy, which prescribes either one or a plurality of check items related to a security check for the above-mentioned plurality of virtual machines, and a security check program; and a CPU (Central Processing Unit) for executing, on the basis of the above-mentioned security check program, a security check for the above-mentioned plurality of virtual machines in accordance with the above-mentioned check policy, the above-mentioned virtual machines including as types a master virtual machine, which is constructed on the basis of master information for configuring either a part or all of a virtual machine, and an individual virtual machine, which is constructed on the basis of individual information that is configured partially or entirely in accordance with the above-mentioned master information, and the above-mentioned CPU selectively executing the security check, for each of the above-mentioned check items, for the type of the virtual machine in accordance with contents of the check items.

Further, in the present invention, a security management method for managing the security of a plurality of virtual machines, which is a virtual computer environment that a physical client provides to a user terminal, comprises a first step for storing a check policy, which prescribes either one or a plurality of check items related to a security check for the above-mentioned plurality of virtual machines, and a security check program; and a second step for executing, on the basis of the above-mentioned security check program, a security check for the above-mentioned plurality of virtual machines in accordance with the above-mentioned check policy, the above-mentioned virtual machines including as types a master virtual machine, which is constructed on the basis of master information for configuring either a part or all of a virtual machine, and an individual virtual machine, which is constructed on the basis of individual information that is configured partially or entirely in accordance with the above-mentioned master information, and the above-mentioned second step selectively executing, for each of the above-mentioned check items, the above-mentioned security check for the above-mentioned virtual machine of the type corresponding to the contents of this check item.

According to the present invention, it is possible to selectively execute a security check for each check item for a required type of virtual machine, thereby enabling the omission of a security check for a type that is not required. In this way, it is possible to realize a security management system and method that enable a security check to be carried out faster and more efficiently.

BRIEF DESCRIPTION OF THE DRAWINGS

FIG. 3 is a table showing the configuration of a check policy management table according to the first embodiment;

FIG. 4 is a table showing the configuration of an individual VM/master VM correspondence management table;

FIG. 5 is a table showing the configuration of a check result management table;

FIG. 6 is a table showing the configuration of a client management table;

FIG. 9 is a table showing the configuration of a virtual machine management table;

FIG. 10 is a table showing the configuration of a physical machine management table;

FIG. 14 is a simplified diagram showing an example of the configuration of the check policy setting window of the first embodiment;

FIG. 22 is a table showing the configuration of a check management policy table according to the second embodiment;

FIG. 27 is a simplified diagram showing an example of the configuration of a check policy setting window according to the third embodiment;

FIG. 32 is a table showing the configuration of a check target management table.

BEST MODE FOR CARRYING OUT THE INVENTION

Figure 1:
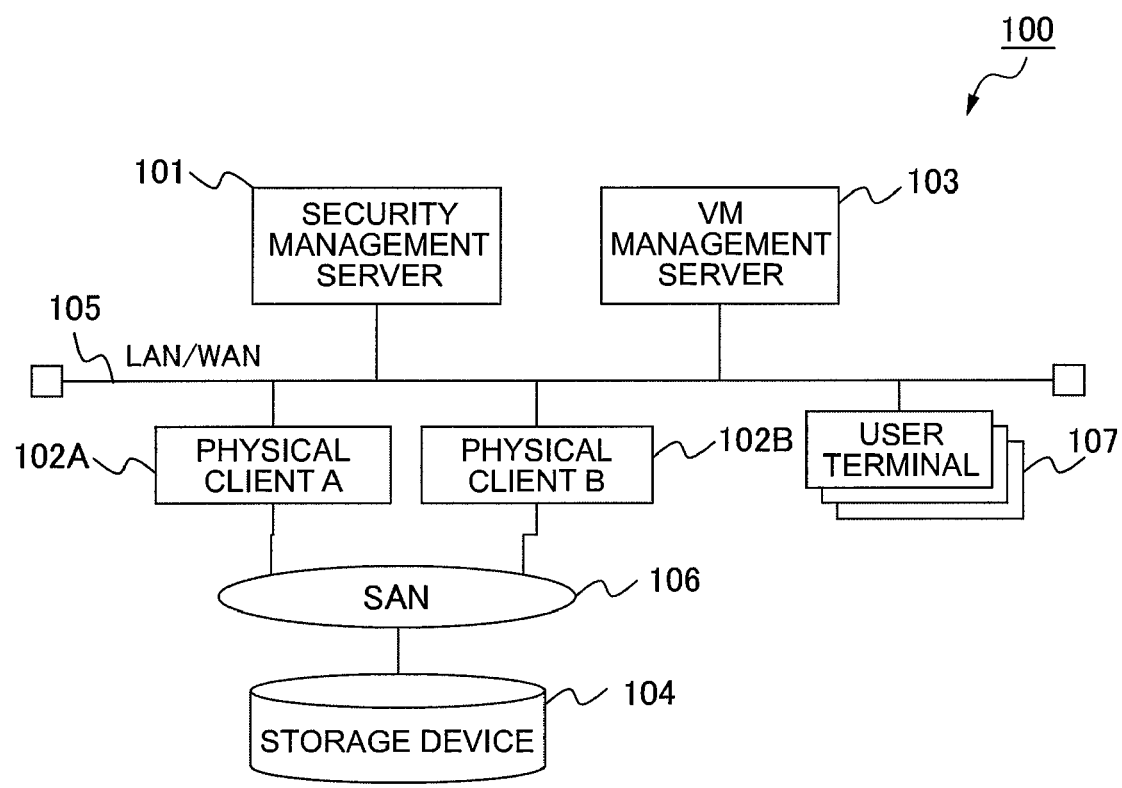
FIG. 1 is a block diagram showing the overall configuration of a network system according to a first embodiment.

One embodiment of the present invention will be explained by referring to the drawings.

Furthermore, in the explanation below, the information of the present invention will be explained using expressions such as "xxx table", "xxx list", "xxx DB" and "xxx queue", but this information may also be expressed as data structures other than a table, list, DB or queue. For this reason, "xxx table", "xxx list", "xxx DB" and "xxx queue", may also be called "xxx information" to show that the information is not dependent on the data structure.

In the explanation that follows, there may cases where an explanation is given having "program" as the subject, but because a process is carried out by executing a program in accordance with a processor while using memory and a communication port (communication control device), the explanation may also employ processor (CPU) as the subject. Further, a process disclosed having a program as the subject may also be carried out by a management server or other such computer, or an information processing system. Further, either a portion or all of a program may be realized in accordance with dedicated hardware.

Various types of programs may also be installed in the respective computers in accordance with a program distribution server or storage media.

(1) First Embodiment (1-1) Configuration of Network System According to this Embodiment In FIG. 1, reference numeral 100 denotes an overall network system according to this embodiment. In this network system 100, a security management server 101, a physical client group comprising first and second physical clients 102A, 102B, a VM (Virtual Machine) management server 103 and a user terminal 107 are interconnected via a network 105 configured from either a LAN (Local Area Network) or a WAN (Wide Area Network). Further, the first and second physical clients 102A, 102B are connected to a storage device 104 via a SAN (Storage Area Network) 106. Furthermore, in this embodiment, for the sake of brevity, an explanation is given of a case in which the physical client group comprises only two units, the first and second physical clients 102A, 102B, but the present invention is also applicable when three or more physical clients make up the physical client group.

The security management server 101, for example, is configured from a personal computer, a workstation, or a mainframe, and manages the security status of respective virtual machines that run on the first and second physical clients 102A, 102B as explained hereinbelow.

The first and second physical clients 102A, 102B provide the user terminal 107 with a virtual machine (this virtual machine will be called a virtual client hereinafter for convenience sake) that is used as a client machine. Further, the VM management server 103 manages virtual clients that run on the first and second physical clients 102A, 102B.

The storage device 104 stores either one or a plurality of machine image information 320, which is the configuration information (information such as data stored in the CPU (Central Processing Unit), memory, communication device and storage device) of the respective virtual clients running on the first and second physical clients 102A, 102B, and the various types of data used by a virtual client.

The user terminal 107 is a terminal device configured from an ordinary individual computer or thin client, and is used by an ordinary user to utilize virtual clients running on the first and second physical clients 102A, 102B. The user terminal 107 is not targeted for security management in accordance with the security management method of this embodiment.

Furthermore, the security management server 101 and the VM management server 103 may be configured from a single computer, and may also be the same computer as the first and second physical clients 102A, 102B. Either part or all of the various programs and information held by the security management server 101 may be disposed on one or more (a plurality of) computers, and a configuration may be adopted in which the security management server 101 is realized by the plurality of computers. Similarly, the configuration may be such that the VM management server 103 is constructed from one or more (a plurality of) computers, and the first and second physical clients 102A, 102B are constructed from one or more (a plurality of) computers.

Further, methods (a) and (b) below may be considered as methods for inputting/outputting commands and information to/from virtual machines running on the first and second physical clients 102A, 102B, but methods other than these may also be used.

(a) A method for providing virtual machines with input from an input/output device, such as a display, keyboard and/or mouse of the first and second physical clients 102A, 102B, and outputting an output of the virtual machine (for example, a display and sound) to this input/output device.

(b) A method for providing a virtual machine with input from an input/output device, such as a display, keyboard and/or mouse, of a computer other than the first and second physical clients 102A, 102B, and outputting an output of the virtual machine (for example, a display and sound) to this input/output device.

(1-2) Security Management Server Configuration

Figure 2:
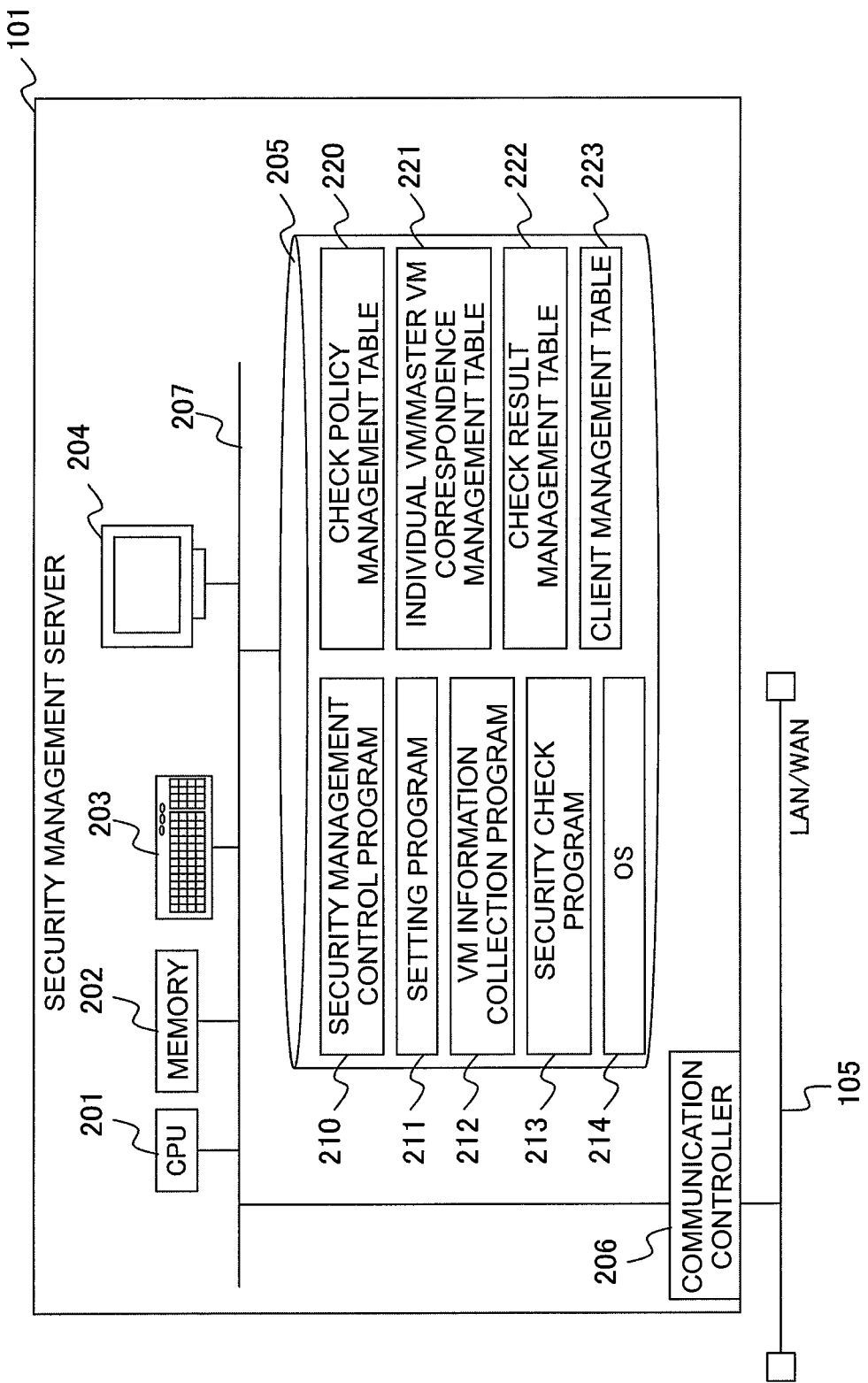
FIG. 2 is a block diagram showing the simplified configuration of a security management server according to the first embodiment.

FIG. 2 shows a specific configuration of the security management server 101 of this embodiment. The security management server 101 comprises a CPU 201, a main memory 202, an instruction input device 203, a display 204, an external storage device 205, and a communication controller 206, and these components are interconnected by way of a system bus 207.

The CPU 201 is a processor in charge of controlling the overall operations of the security management server 101. Processing such as that described hereinbelow is performed by the security management server 101 in accordance with this CPU 201 executing various programs stored in the main memory 202. Further, the main memory 202, in addition to being used for holding various types of programs and information, is also utilized as the CPU 201 working memory.

The instruction input device 203 is for inputting a variety of instructions to the security management server 101, and is configured from a keyboard and/or mouse. The display 204, for example, is configured from a liquid crystal panel or CRT (Cathode Ray Tube), and, under the control of the CPU 201, displays the status and results of processes executed by the security management server 101.

The external storage device 205, for example, is a high-capacity storage medium configured from a hard disk device, and is utilized for storing various types of programs and data. A program stored in the external storage device 205 is loaded into the main memory 202 in accordance with a program start command from the instruction input device 203, and is executed by the CPU 201. The communication controller 206 is used for exchanging various data and commands with the other devices connected to the network 105 by way of this network 105.

Furthermore, the security management server 101 may have input-output devices other than the instruction input device 203 and display 204, and furthermore, a computer other than the security management server 101 may have this input-output device. In accordance with this, the security management server 101 may receive input from an input-output device of this computer, and may realize outputting to an input-output device of this computer in accordance with sending virtual client VM output (for example, a display and/or sound) to this computer.

The principal programs stored in the external storage device 205 of the security management server 101 in accordance with this embodiment will be explained here.

In the case of this embodiment, the above-described security management server 101 manages the security of the respective virtual clients running on the first and second physical clients 102A, 102B. As means for achieving this, programs such as a security management control program 210, a setting program 211, a VM information collection program 212, a security check program 213 and an OS 214 are stored in the external storage device 205 as shown in FIG. 2.

Of these programs, the security management control program 210 is for controlling the various programs of the security management server 101, and the setting program 211 is for carrying out various settings in accordance with instructions from the user.

The VM information collection program 212 is for collecting virtual client management information from the VM management server 103, and either creating or updating a client management table 223 described hereinbelow.

Furthermore, the security check program 213 is for carrying out security checks on the respective clients registered in the client management table 223. The OS 214 provides the basic functions, such as inputting and outputting data to and from the peripheral devices, for executing the respective programs on the computer.

Next, the principal information stored in the external storage device 205 will be explained. But before doing so, the terminology "master information", "master VM", "individual customized information" and "individual VM" will be defined first.

Hereinafter, the term "master information" shall refer to information for configuring a virtual machine, with the exception of the individually customized portions in an environment of individual virtual machines (virtual clients) and individual users. Information configuring a virtual machine refers to either a part or an entire machine image. Machine image refers to the various information required to start up a virtual machine, which comprises the specifications, numbers and capacities of hardware, such as the virtual machine CPU, memory and communication controller, the BIOS settings, and a disk image for virtual machine disk emulation. Furthermore, for a plurality of virtual machines having the same master information, the master information constitutes the shared portions of the information configuring the virtual machines.

"Master VM" refers to the virtual machine targeted when carrying out a security check of the master information.

"Individual customized information" refers to individually customized portions of information in a case where a virtual machine is individually customized on the bases of the master information. For example, this expression corresponds to information related to the customized desktop environment and user profiles of each user, and information regarding software individually installed in special-purpose virtual machines (virtual clients).

"Individual VM" refers to a virtual machine targeted when carrying out a security check of individual customized information.

Specific examples of "master information" and "individual customized information" will be explained. For example, the machine image of a virtual machine A, which has been installed with a certain software A, is copied, and a virtual machine B having the same configuration as this virtual machine A, is created. Thereafter, when software B is installed in this virtual machine B, the machine image of virtual machine A, which comprises software A, is the master information, and the individually customized portion in virtual machine B, which comprises software B, that is, the difference between the machine image of virtual machine A and the machine image of virtual machine B is the individual customized information.

As another example, in virtualization technology (for example, Japanese Patent Application Laid-open No. 2006-221649), which starts up a plurality of virtual machines on the basis of virtual machine-configuring information that is shared by the plurality of virtual machines, and which individually manages the difference information of each virtual machine, the "virtual machine configuring information shared by the plurality of virtual machines" corresponds to the "master information", and the "difference information of each virtual machine" corresponds to the individual customized information.

Returning to the explanation of the principal information stored in the external storage device 205 of the security management server 101, in the case of this embodiment, as means for the security management server 101 to manage the security of the respective virtual clients running on the first and second physical clients 102A, 102B, as shown in FIG. 2, a check policy management table 220, an individual VM/master VM correspondence management table 221, a check result management table 222, and a client management table 223 are stored in the external storage device 205.

Figure 13:
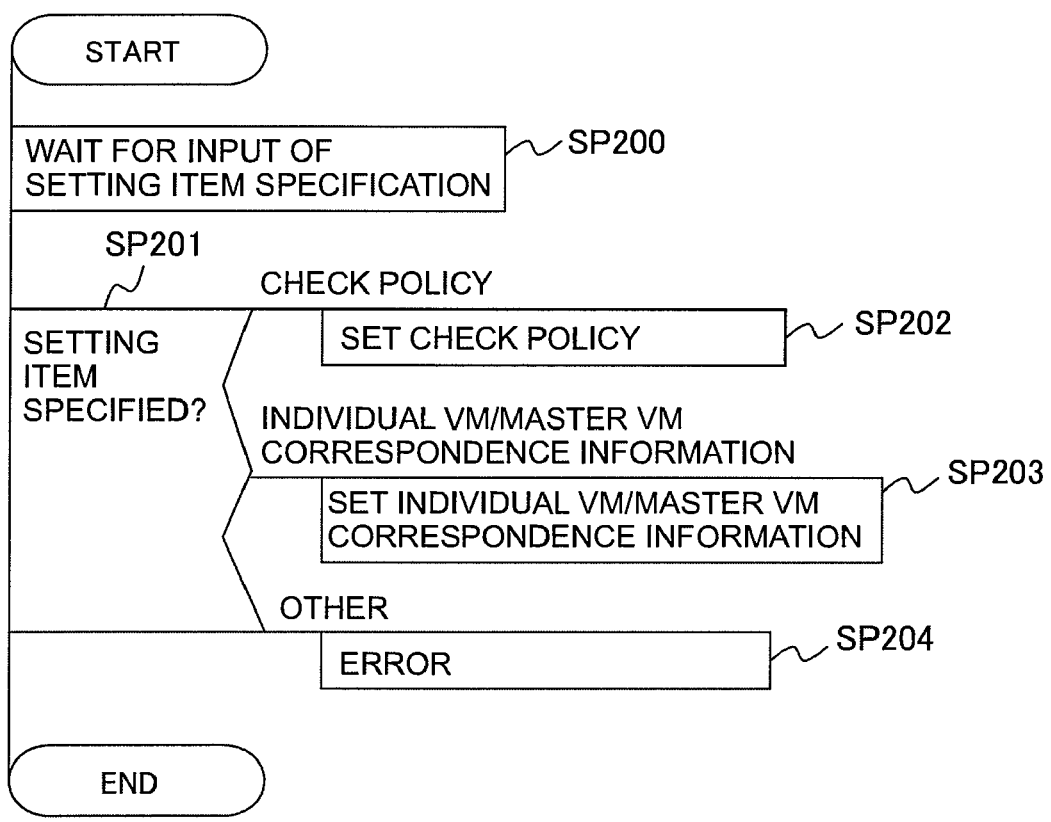
FIG. 13 is a PAD diagram showing the processing steps of a setting process according to the first embodiment.

The check policy management table 220 is for managing the policy of a security check to be executed with respect to virtual clients running on the first and second physical clients 102A, 102B, and, as will be explained hereinbelow using FIGS. 13 and 14, is created by the setting program 211 in accordance with an administrator setting operation utilizing a check policy setting window 500 shown in FIG. 14.

This check policy management table 220, as shown in FIG. 3, is configured from an item-to-check column 220A, an ID column 220B, a details column 220C, a check target column 220D, a priority column 220E and a check period column 220F.

The item-to-check column 220A stores the names of items (called items to check hereinafter) for which security checks fixedly specified beforehand are to be executed.

In the case of this embodiment, there are five such items to check: an "update program determination" for determining whether or not a prescribed update program is being used; an "anti-virus product determination" for determining whether or not an anti-virus product is installed; an "unauthorized software determination" for determining whether or not an installation-prohibited unauthorized software is installed; a "compulsory software determination" for determining whether or not software that should always be installed is installed; and a "security settings determination" for determining whether or not the correct security settings have been made. However, the number and contents of the items to check are not limited thereto.

The details column 220C stores detailed items regarding the corresponding items to check. For example, in FIG. 3, the need for respective checks to determine whether or not the check-targeted virtual machines are using "patch A", "patch B", . . . is specified for the "update program", and the need to check whether or not either version "1.0" of "virus checker A" defined on "2008/1/1" or version "1.0" of "virus checker B" defined on "2008/1/1" is installed is specified for "anti-virus product".

Hereinafter, each detailed item to be subjected to a security check within an item to check shall be called a check item. For example, each check as to whether or not "patch A", "patch B", . . . are being used with respect to the item to check labeled "update program" corresponds to a check item. Further, each check as to whether or not version "2.0" of "software X", all versions of "software Y", . . . are respectively installed with respect to the item to check labeled "unauthorized software" corresponds to a check item. Furthermore, a check as to whether or not any of the anti-virus products cited in details column 220C are installed with respect to the item to check labeled "anti-virus product" corresponds to one check item.

ID column 220B stores an ID that has been assigned to the corresponding check item. In FIG. 3, for example, the ID "C1-01" is assigned for the check item "patch A" of the item to check labeled "update program", and the ID "C1-02" is assigned for the check item "patch B" of the item to check labeled "update program".

The check target column 220D stores the target for which a security check is to be executed for the corresponding check item. Specifically, any of "master", "individual", "master or individual" and "master and individual" is stored in the check target column 220D. "Master" signifies the fact that only the master VM needs to pass the check, and "individual" signifies the fact that only the individual VM needs to pass the check. Further, "master or individual" signifies the fact that either one of the master VM or the individual VM needs to pass the check, and "master and individual" signifies the fact that both the master VM and the individual VM need to pass the check.

For example, in a case where a certain software is installed in the master VM and distributed, since the software installed in the master VM is also installed in the individual VM, "master" is designated as the check target in the check item for determining the installation status of this software. In a case where "master" is designated, a security check is carried out only for the master VM for this check item, and the result of this check is used as the check result for all the individual VM associated to this master VM rather than just for this master VM alone.

"Individual" is set as the check target for a check item that determines if the security settings have been illegally changed by an individual user. In a case where "individual" is set, the security check for this check item is carried out only for an individual VM, and the check result thereof is used as the check result only for this individual VM. Furthermore, the master VM does not fall within the check target for this check item.

The priority column 220E stores a priority that has been set for a corresponding check item. In the case of this embodiment, any of "high", "medium" or "low" may be set as this priority. Furthermore, as long as the value set as the priority represents the priority of the check item, other values may also be set.

Of these setting values, "high" signifies that, barring any problems such as a shortage of free system resources, the check should be carried out as quickly as possible. "Medium" signifies that a check should be done within the check period by starting up the relevant virtual client on a free resource when the virtual client is not in use so as not to bother the user of the check-targeted virtual client.

As for "low", a check should be carried out within the check period by starting up the relevant virtual client on a free resource when the virtual client is not in use the same as with "medium", but in a case where there is concern that starting up the relevant virtual client will have an adverse affect on the other virtual clients due to a shortage of remaining free system resources, the check may be held back. In this embodiment, in a case where the free system resource capacity is such that starting up the relevant virtual client will make it impossible to start up another virtual client, a check is not carried out until there is sufficient free resource capacity.

Furthermore, for any check item for which the priority has been set to either "medium" or "low", the security check shall be carried out as quickly as possible in a case where the check period described hereinbelow has expired.

In the case of this embodiment, "high", "medium" and "low" have the above-mentioned meanings, but these values may have other meanings if they are the data for determining whether the check process for the relevant check item will be carried out immediately or will be carried afterwards in accordance with the state of the system and the priority value for each check item.

The check period column 220F stores a period (called the check period hereinafter) during which a security check set for the corresponding check item is to be executed.

This check policy management table 220 is referenced when the security check program 213 executes a security check for each virtual client.

The individual VM/master VM correspondence table 221 is for managing the corresponding relationship between respective virtual clients (individual VM) and a virtual client (master VM) for checking the master information of a relevant virtual client, and as will be explained hereinbelow for FIGS. 13 and 15, respective entries are registered by the setting program 211 in accordance with an administrator setting operation using an individual VM/master VM correspondence setting window 600 shown in FIG. 15. However, since the corresponding relationship between individual VM and master VM is also managed in the VM management server 103, the setting program 211 may regularly acquire this information from the VM management server 103, and may automatically update the individual VM/master VM correspondence management table 221.

This individual VM/master VM correspondence management table 221, as shown in FIG. 4, is configured from a individual VM column 221A and a master VM column 221B.

An ID (called the machine ID hereinafter) assigned to a corresponding virtual client is stored in the clone VM column 221A, and a machine ID of a corresponding master VM is stored in the master VM column 221B.

The check result management table 222 is for managing the result of a security check for an individual VM and a master VM, and, as shown in FIG. 5, is configured from a CID column 222A, a machine ID column 222B and a plurality of ID columns 222C.

The CID column 222A stores identification information (CID) assigned to a security check of this check period. The machine ID column 222B stores a machine ID of a corresponding virtual client for which a security check has been carried out.

Furthermore, the respective ID columns 222C correspond to the IDs assigned to the above-mentioned respective check items in FIG. 3 (refer to ID columns 220B), and the check results of security checks executed for corresponding virtual clients at the time of the respective corresponding security checks are stored in these ID columns 222C.

For example, in FIG. 5, "O" signifies that a virtual machine has passed the security check related to the check item of the virtual machine for the check period, "x" signifies that the virtual machine has failed this security check, and "-" signifies that the virtual machine was not targeted for this security check. Also, "pending" signifies that the security check has yet to be carried out (unchecked). In FIG. 5, the row enclosed within broken line 222D represents an example of the check results of a security check with respect to a master VM, and the areas enclosed within broken lines 222E, 222F and 222G represent results that reflect the check results of the security check with respect to the master VM for the individual VM as well.

A variety of methods may be used as the checking method of a security check for a virtual client, to include an agent-less method, which checks the security status based on information collected using WMI (Windows (registered trademark) Management Instrumentation) or SSH (Secure Shell), and a method, which checks the security status by acquiring information from an agent running on the virtual client. Either method may be used in this embodiment.

The client management table 223 is for managing security check-targeted virtual clients running on the first and second physical clients 102A, 102B in the security management server 101, and virtual machine management information read out from a virtual machine management table 420 of the VM management server 103 is respectively stored therein.

This client management table 223 is substantially configured from a machine ID column 223A, an IP address column 223B, a corresponding physical machine ID column 223C and a resource information column 223D as shown in FIG. 6.

The machine ID column 223A stores machine IDs respectively assigned to the virtual clients and physical clients that exist in the system, and the IP address column 223B stores IP addresses for accessing either the virtual clients or the physical clients.

The corresponding physical machine ID column 223C stores identification information (physical machine ID) that has been assigned to a physical client (either the first or second physical client 102A, 102B) on which the virtual client is running in a case where the corresponding virtual machine is the virtual client.

The resource information column 223D is configured from a CPU column 223DA, a memory column 223DB, and a disk column 223DC, and the CPU column 223DA, memory column 223DB and disk column 223DC store the resource capacities, such as the CPU, memory, and disk that have been respectively allocated to either the corresponding virtual client or physical client. However, this resource information column 223D may be omitted.

Furthermore, the above-mentioned check policy management table 220, individual VM/master VM correspondence management table 221, check result management table 222 and client management table 223 need not reside inside the external storage device 205 prior to program startup since the program dynamically creates and updates these tables. These tables may be held in the main memory 202 from initialization without being stored in the external storage device 205.

(1-3) Physical Client Configuration

Next, the configurations of the first and second physical clients 102A, 102B will be explained. Since the second physical client 102B has the same configuration as the first physical client 102A, only the configuration of the first physical client 102A will be explained here, and an explanation of the configuration of the second physical client 102B will be omitted.

Figure 7:
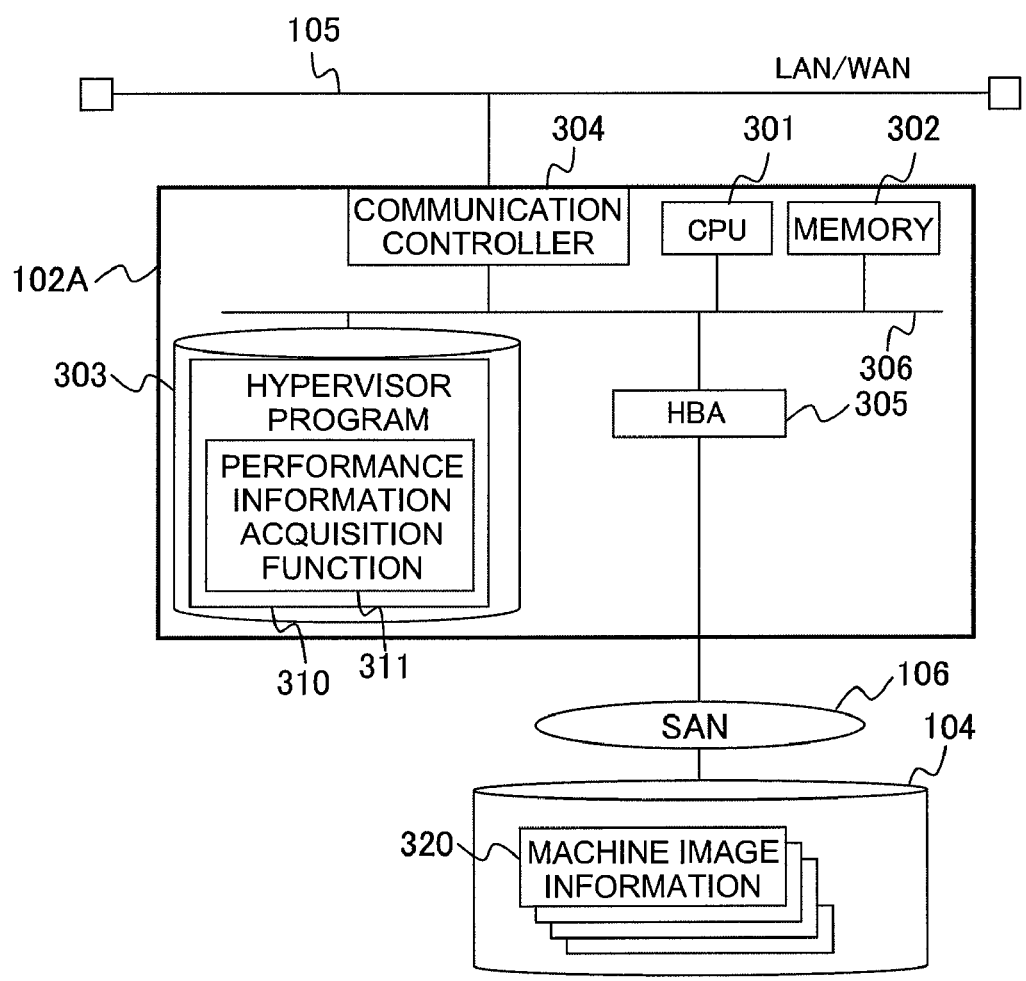
FIG. 7 is a block diagram showing a simplified configuration of a physical client according to the first embodiment.

FIG. 7 shows a simplified configuration of the first physical client 102A. As shown in FIG. 7, the first physical client 102A is configured by interconnecting a CPU 301, a main memory 302, an external storage device 303, a communication controller 304, and a host bus adapter (HBA) 305 via a system bus 306.

The CPU 301 is a processor in charge of controlling the overall operations of the first physical client 102A. Various types of processing, such as providing a virtual client to a user terminal 107, is performed by the first physical client 102A in accordance with this CPU 301 executing various programs that are stored in the main memory 302. Further, the main memory 302, in addition to being used for holding these various programs and various types of information, is also utilized as the CPU 301 working memory.

The communication controller 304 comprises communication control functions for exchanging various data and commands with the other devices connected to the network 105 by way of this network 105. The host bus adapter 305 comprises communication control functions for writing and reading data to and from the storage device 104 by way of the SAN 106.

The external storage device 303, for example, is a high-capacity storage medium configured from a hard disk device, and is utilized for holding various types of programs, such as a hypervisor program 310.

The hypervisor program 310 is for running a virtual client using the hardware resources of the first physical client 102A, such as the CPU 301, main memory 302, external storage device 303 and communication controller 304, on the basis of machine image information 320 stored in the storage device 104. "Machine image information" refers to the various types of information required for starting up virtual clients respectively provided to the user terminals 107, these virtual clients comprising the specifications, numbers and capacities of hardware such as the virtual client CPU, memory and communication controller, the BIOS settings, and a disk image for virtual machine disk emulation.

The hypervisor program 310 also comprises a performance information acquisition function 311. The performance information acquisition function 311 is able to acquire the CPU utilization rate and the amount of memory being used in the first physical client 102A by way of the network 105. Methods for acquiring information in accordance with the performance information acquisition function 311, for example, include a method that provides MIB (Management Information Base) information in accordance with a SNMP (Simple Network Management Protocol) agent, a method that comprises a WMI or other such management interface, or a method that uses SSH to remotely execute a performance information acquisition command.

Virtual machine (virtual client) machine image information 320, which is used by the hypervisor program 310, is stored in the storage device 104. The storage device 104 is connected to the first and second physical clients 102A, 102B by way of the SAN 106, and the machine image information 320 may be referenced by the hypervisor program 310 running on either the first or second physical client 102A, 102B. In the case of this embodiment, the machine image information 320 is configured from either one or plurality of reproducible files.

The hypervisor program 310 reads in the machine image information 320, determines the resource capacity (CPU processing time, memory capacity, disk capacity, and so forth) to be allocated to a virtual machine and the hardware (CPU, communication controller and the like) to be emulated, and performs virtual machine (virtual client) emulation by converting the control of the resource capacity to be allocated to the virtual machine and the commands for the hardware to be emulated to commands for the various hardware resources of the first and second physical clients 102A, 102B. The hypervisor program 310 also reads in programs, such as an OS and application, and various types of setting information and/or user data stored in the disk image inside the machine image information 320, and executes the various types of software that will run on the virtual machine. In addition, the hypervisor program 310 comprises a function for copying various files stored in either the external storage device 303 or the storage device 104 via the network 105 the same as an ordinary OS.

(1-4) VM Management Server Configuration

Figure 8:
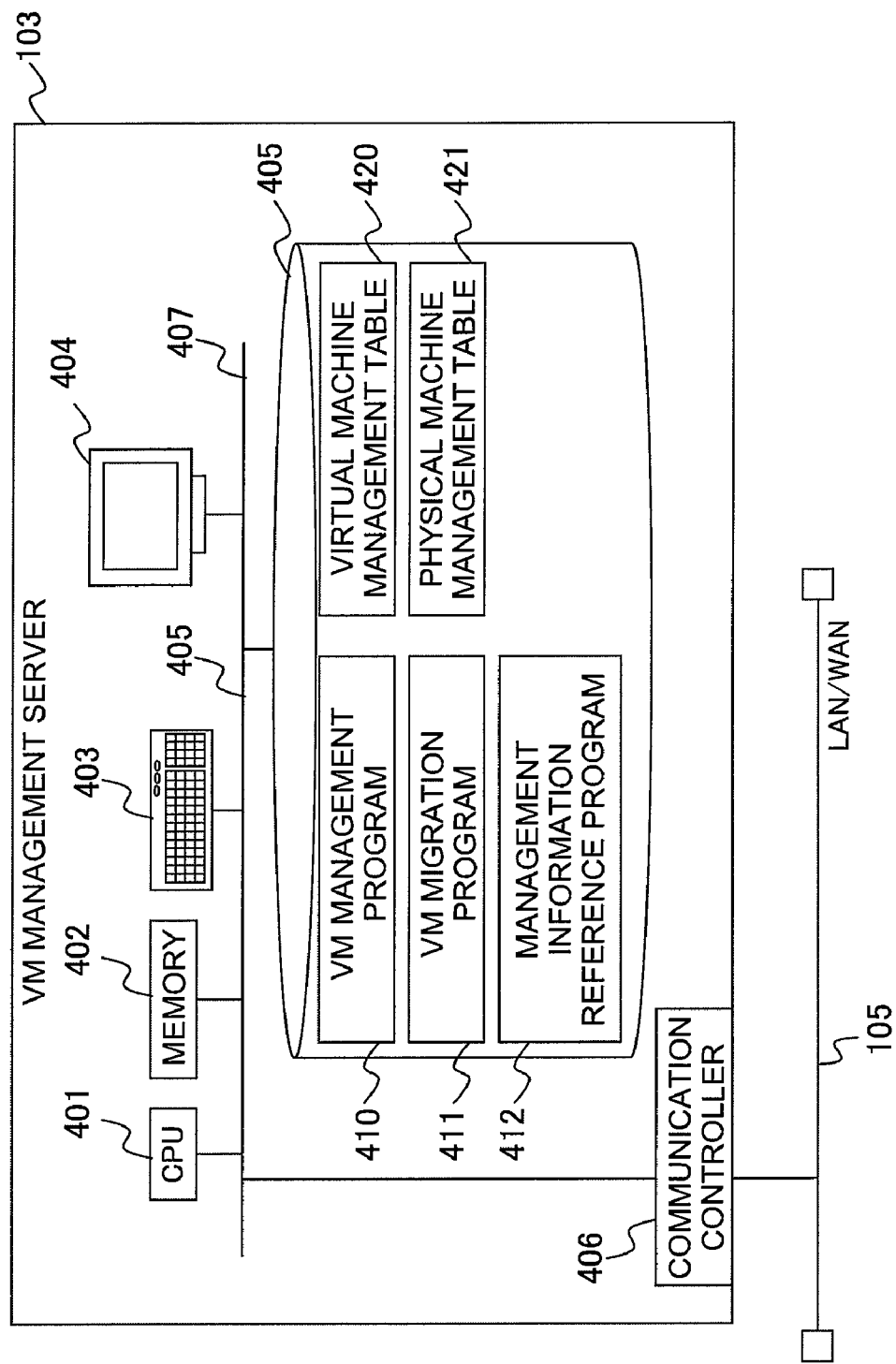
FIG. 8 is a block diagram showing a simplified configuration of a VM management server according to the first embodiment.

FIG. 8 shows a simplified configuration of the VM management server 103 of this embodiment. The VM management server 103 comprises a CPU 401, a main memory 402, an instruction input device 403, a display 404, an external storage device 405, and a communication controller 406, and these components are configured in accordance with being interconnected by way of a system bus 407.

The CPU 401 is a processor in charge of controlling the overall operations of the VM management server 103. Processing such as that described hereinbelow is performed by the VM management server 103 in accordance with this CPU 401 executing various programs stored in the main memory 402. Further, the main memory 402, in addition to being used for holding various types of programs and information, is also utilized as the CPU 401 working memory.

The instruction input device 403 is for inputting a variety of instructions to the security management server 101, and is configured from a keyboard and/or mouse. The display 404, for example, is configured from a liquid crystal panel or CRT, and, under the control of the CPU 401, displays the status and results of processes executed by the VM management server 103.

The external storage device 405, for example, is a high-capacity storage medium configured from a hard disk device, and is utilized for storing various types of programs and data. A program stored in the external storage device 405 is loaded into the main memory 402 in accordance with a program start command from the instruction input device 403, and is executed by the CPU 401. The communication controller 406 is used for exchanging various data and commands with the other devices connected to the network 105 by way of this network 105.

The principal programs stored in the external storage device 405 of the VM management server 103 in accordance with this embodiment will be explained here.

In the case of this embodiment, the above-mentioned VM management server 103 manages the virtual clients running on the first and second physical clients 102A, 102A. As means for achieving this, a group of programs, such as a VM management program 410, a VM migration program 411, and a management information reference program 412, a virtual machine management table 420 and a physical machine management table 421 are stored in the external storage device 405 as shown in FIG. 8.

Of these programs, the VM management program 410 is for carrying out the creation, deletion, startup and shutdown of a virtual machine in accordance with an instruction from the user utilizing the instruction input device 403 and instructions from other programs via the network 105, and, based on the results thereof, for registering the management information and statuses of the respective virtual machines in the virtual machine management table 420. The VM management program 410 also has functions for either partially or entirely reproducing the machine image of an existing virtual machine, and in accordance with technology conforming thereto, creating a virtual machine having the same configuration as the existing virtual machine. The creation of this virtual machine, for example, is realized by issuing an instruction to the hypervisor program 310 by way of the network 105 to copy the file constituting the machine image in accordance with a machine image reproduction command using the instruction input device 403.

The VM migration program 411 is for migrating a virtual machine on one physical machine to another physical machine in accordance with an instruction from a user utilizing the instruction input device 403, and instructions from other programs by way of the network 105.

The management information reference program 412 is for restoring the information of the virtual machine management table 420 and the physical machine management table 421 in accordance with an instruction from a user utilizing the instruction input device 403, and instructions from other programs by way of the network 105.

The virtual machine management table 420 is used for managing various types of management information, such as virtual machine identification information, IP addresses, identification information of the physical client (the first or second physical client 102A, 102B) on which the virtual machine is running, the required resource capacity (resource capacities of the CPU, memory and so forth allocated to the virtual machine), and the status ("running" or "suspended") for the respective virtual machines targeted for management by the VM management server 103.

This virtual machine management table 420 is substantially configured from a machine ID column 420A, an IP address column 420B, a corresponding physical machine ID column 420C, a status column 420D, and a resource information column 420E as shown in FIG. 9. The respective machine ID column 420A, IP address column 420B and corresponding physical machine ID column 420C store the same information as that of the machine ID column 223A, IP address column 223B and corresponding physical machine ID column 223C for the entries corresponding to the virtual client from among the entries of the client management table 223 described above with respect to FIG. 6. The status column 420D stores a value representing the status (running or suspended) of the corresponding virtual machine at the time.

The resource information column 420E is configured from a CPU column 420EA, a memory column 420EB and a disk column 420EC, and the CPU column 420EA, memory column 420EB and disk column 420EC respectively store the same information as the information stored in the CPU column 223DA, memory column 223DB and disk column 223DC corresponding to the client management table 223 of FIG. 6.

The physical machine management table 421 is for managing the physical machines connected to the network 105 (the first and second physical clients 102A, 102B in this embodiment), and as shown in FIG. 10, is configured from a machine ID column 421A, an IP address column 421B, and a resource information column 421C.

The machine ID column 421A stores identification information that has been assigned to a corresponding physical machine, and the IP address column 421B stores the IP address information of this physical machine. The resource information column 421C is configured from a CPU information column 421CA, a memory information column 421CB, and a disk information column 421CC, and the CPU information column 421CA, memory information column 421CB, and disk information column 421CC respectively store the specifications for the CPU, memory and disk mounted in the corresponding physical machine.

(1-5) Logical Configuration and Setting Contents

Figure 11:
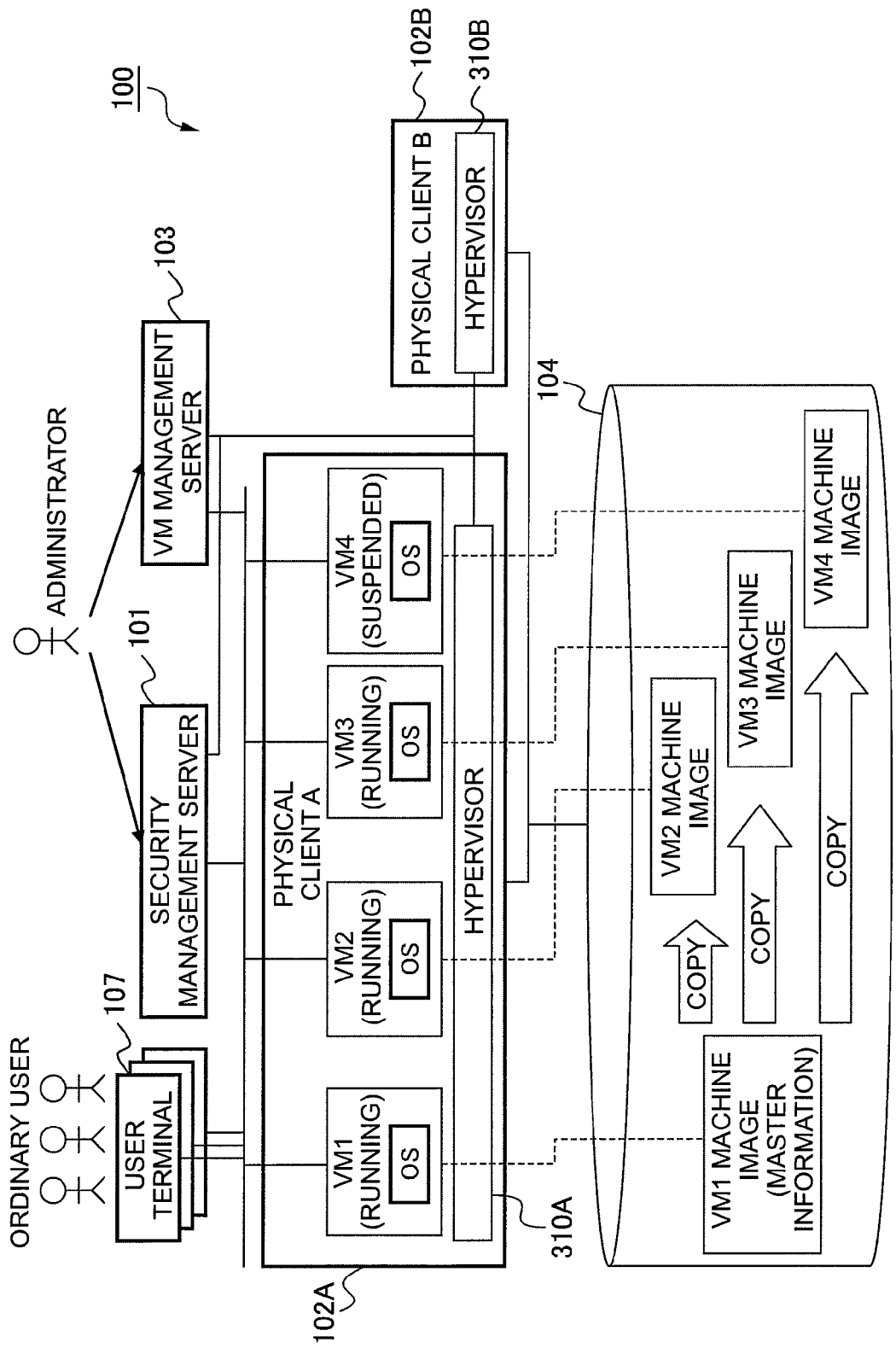
FIG. 11 is a block diagram showing the logical configuration of the network system according to the first embodiment.

Next, the logical configuration of the network system 100 according to this embodiment will be explained. FIG. 11 shows an example of the logical configuration of the network system 100 of this embodiment.

First through fourth virtual clients VM1 through VM4 exist in the hypervisor program 310A of the first physical client 102A, and the statuses of these first through fourth virtual clients VM1 through VM4 constitute running for the first through the third virtual clients VM1 through VM3, and constitutes suspended for the fourth virtual client VM4. Not even one virtual client exists in the hypervisor program 310B of the second physical client 102B.

The machine images of the first through the fourth virtual clients VM1 through VM4 are stored in the storage device 104. The machine images of the second through the fourth virtual clients VM2 through VM4 were created by reproducing the machine image of the first virtual client VM1. The machine image reproductions, for example, are realized in accordance with the administrator using the VM management server 103 to issue an instruction to the hypervisor program 310A via the network 105 to copy the file configuring the machine image.

As for the first virtual client VM1, when the administrator is creating a virtual client to provide to an ordinary user, the administrator reproduces and uses the machine image information 320 to create a new virtual client so as not to have to construct a virtual client from scratch.

The second through fourth virtual clients VM2 through VM4 are virtual machines used by ordinary users, and these second through fourth virtual clients VM2 through VM4 are customized by the ordinary user. However, in this embodiment, the items capable of being customized by an ordinary user are limited to (A) through (C) below in accordance with the user privilege settings and OS settings (registry and other such settings) with respect to the directories and files of the first virtual client VM1.

(A) Individual desktop environment settings (such as the wallpaper and screensaver settings)
(B) Individual profile information (such as a personal password)
(C) The creation, alteration and deletion of user files, or the allocation of files introduced from outside (allocation of files introduced from outside the machine via charitable media or the network 105) to a specific directory accessible via user privileges.

Information related to the first through fourth virtual clients VM1 through VM4 is registered in a virtual machine management table 420 (FIG. 9) of the VM management server 103. Further, information related to the first and second physical clients 102A, 102B is registered in a physical machine management table 421 (FIG. 10).

Furthermore, information to the effect that the master VM of the second through fourth virtual clients VM2 through VM4 is the first virtual client VM1 is respectively registered in the individual VM/master VM correspondence management table 221 (FIG. 4) of the security management server 101.

(1-6) Processing Steps

Next, the processing steps of the respective programs related to the virtual client security management method according to this embodiment will be explained. Hereinbelow, the various processes will be explained as being performed by a "program", but of course the corresponding CPU 201, 301, 401 will actually execute this processing on the basis of the "program".

(1-6-1) Security Management Control Program Process

Figure 12:
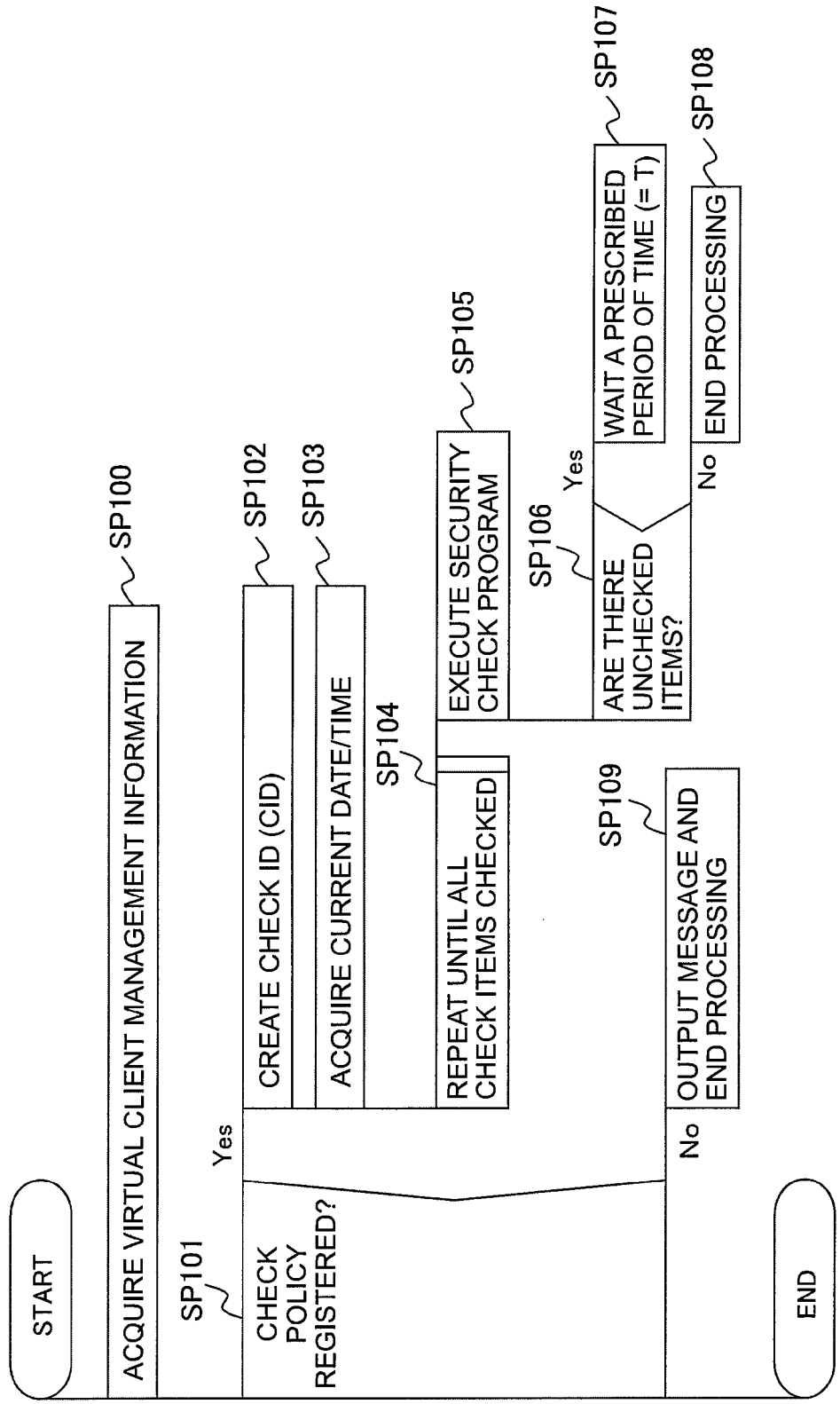
FIG. 12 is a PAD diagram showing the processing steps of a security management control process according to the first embodiment.

First, the processing of the security management control program 210 (FIG. 2) of the security management server 101 (FIG. 2) will be explained. FIG. 12 shows the processing steps of the security management control process executed in accordance with the security management control program 210 of this embodiment.

The security management control program 210, upon being started up in accordance with a security check start instruction command from the instruction input device 203, first acquires from the management information reference program 412 of the VM management server 103 information related to the respective virtual clients running on the first and second physical clients 102A, 102B, and stores the acquired information related to the respective virtual clients in the client management table 223 (SP100).

Next, the security management control program 210 determines whether or not a check policy has been registered in the check policy management table 220 (SP101). If a negative result is obtained in this determination, the security management control program 210 then outputs to the display 204 a message urging the setting of a check policy, and ends this security management control process (SP109).

By contrast, if an affirmative result is obtained in the determination of Step SP101, the security management control program 210 generates a check ID (the CID in FIG. 5), which is unique identification information for each series of security check processes (a series of processes until checks of all the check items have been completed in accordance with repeated processing of SP104) (SP102). This check ID is used for determining whether or not the check result stored inside the check result management table 222 is the check result of the current security check. As long as it is unique, the check ID may be character string data such as a GUID (Global Unique Identifier), the uniqueness of which is guaranteed, serial number numeric data, or data of another format. Next, the security management control program 210 acquires the present date and time from the OS 214, and stores this date/time in the memory 202 (SP103).

Thereafter, the security management control program 210 repeatedly executes the processing of Steps SP105 through SP108 explained hereinbelow until checks of all the check items set in the check policy have been completed (SP104).

That is, the security management control program 210 executes the security check program 213 and carries out security checks for each virtual client (SP105). Furthermore, upon executing the security check program 213, the security management control program 210 transfers the check ID created in Step SP102, the date/time data acquired in Step SP103, and an interval time (=T) for the repetitive processes of Step SP104 in accordance with the program arguments. In this embodiment, the value of the interval time is assumed to be a fixed value T stipulated by the system, but the configuration may also be such that the administrator specifies the interval time value as one item of the check policy.

Next, the security management control program 210 verifies the check result management table 222, and determines whether or not there remains a check item for which checking has still not been completed (SP106).

When an affirmative result is obtained in this determination, after waiting for a fixed period of time (=T) (SP107), the security management control program 210 returns to Step SP104 and thereafter repeats the processing of Steps SP104 through SP107 until a negative result is obtained in Step SP106.

Then, the security management control program 210, upon eventually obtaining a negative result in Step SP106 in accordance with completing the security check for all the check items, ends this security management control process (SP108).

(1-6-2) Setting Program Process

FIG. 13 shows the processing steps of a setting process executed in accordance with the setting program 211 of the security management server 101 (FIG. 2). The setting program 211, upon being started up in accordance with a setting program start instruction command from the instruction input device 203, at that time displays on the display 204 a message urging the specification of an item (called the setting target item hereinafter) as to what type of setting is to be performed, and waits for the administrator to specify a setting target item (SP200).

Then, when the setting target item has eventually been specified, the setting program 211 then determines if the setting target item specified at this time is either of a "check policy setting" or an "individual VM/master VM corresponding relationship setting" (SP201).

In a case where the setting target item specified at this time is determined to be the "check policy setting" in the determination of Step SP201, the setting program 211 then displays on the display 204 a predetermined GUI window for setting a check policy (called the check policy setting window hereinafter). The administrator is thereby able to set a desired check policy by using this check policy setting window. The setting program 211 then stores the check policy set by the administrator at this time in the check policy management table 220 (SP202), and thereafter ends the setting process.

In a case where the setting target item specified at this time is determined to be the "individual VM/master VM corresponding relationship setting" in the determination of Step SP201, the setting program 211 displays on the display 204 a predetermined GUI window for setting an individual VM/master VM corresponding relationship (called the individual VM/master VM correspondence setting window hereinafter). The administrator is thereby able to set a desired individual VM/master VM corresponding relationship by using this individual VM/master VM correspondence setting window. The setting program 211 then stores the individual VM/master VM corresponding relationship set by the administrator at this time in the individual VM/master VM correspondence management table 221 (SP203), and thereafter ends the setting process.

When it has been determined in the determination of Step SP201 that the setting target item specified at this time is neither a "check policy setting" nor an "individual VM/master VM corresponding relationship setting", the setting program 211 displays an error on the display 204 (SP204), and thereafter ends this setting process.

An example of the configuration of the check policy setting window is shown in FIG. 14. In the check policy setting window 500 of FIG. 14, there is disposed check policy advanced setting portions 501 through 505, each of which corresponds to preset items that serve as the check items of a security check. In the case of this embodiment, the above-mentioned check items include five preset items: "update program determination", "anti-virus product determination", "unauthorized software determination", "compulsory software determination" and "security setting determination".

For example, in the check policy advanced setting portion 501 corresponding to the check item "update program determination", it is possible to specify an update program to check whether or not an update has been applied, and it is possible to specify a check target, priority, and check period for each specified update program.

In check policy advanced setting portion 502 corresponding to the check item "anti-virus product determination", it is possible to specify an authorized anti-virus product and the virus definition file version and date of this anti-virus product, a check target, priority, and check period.

In check policy advanced setting portion 503 corresponding to the check item "unauthorized software determination", it is possible to specify installation-prohibited software and the version of this software, and it is possible to specify a check target, priority, and check period for each specified software.

In check policy advanced setting portion 504 corresponding to the check item "compulsory software determination", it is possible to specify software that must always be installed, and it is possible to specify a check target, priority, and check period for each specified software.

In check policy advanced setting portion 505 corresponding to the check item "security setting determination", it is possible to specify check yes/no, a check target, priority, and check period for each check item related to a security setting prepared beforehand.

In the check policy advanced setting portions 501 through 504 other than check policy advanced setting portion 505 corresponding to the check item "security setting determination", there are disposed radio switches 501A through 504A for specifying whether or not to make the respective corresponding check items check targets.

After inputting the required items into the desired check policy advanced setting portion 501 in the check policy setting window 500, it is possible to close this check policy setting window 500 by clicking on either an OK button 506 or a Cancel button 507.

In a case where the OK button 506 is clicked at this time, the setting program 211 either registers the information specified in the check policy setting window 500 anew in the check policy management table 220, or updates the check policy management table 220 based on the information specified in the check policy setting window 500, and in a case where the Cancel button 507 is clicked, ends the processing without doing anything.

Figure 15:
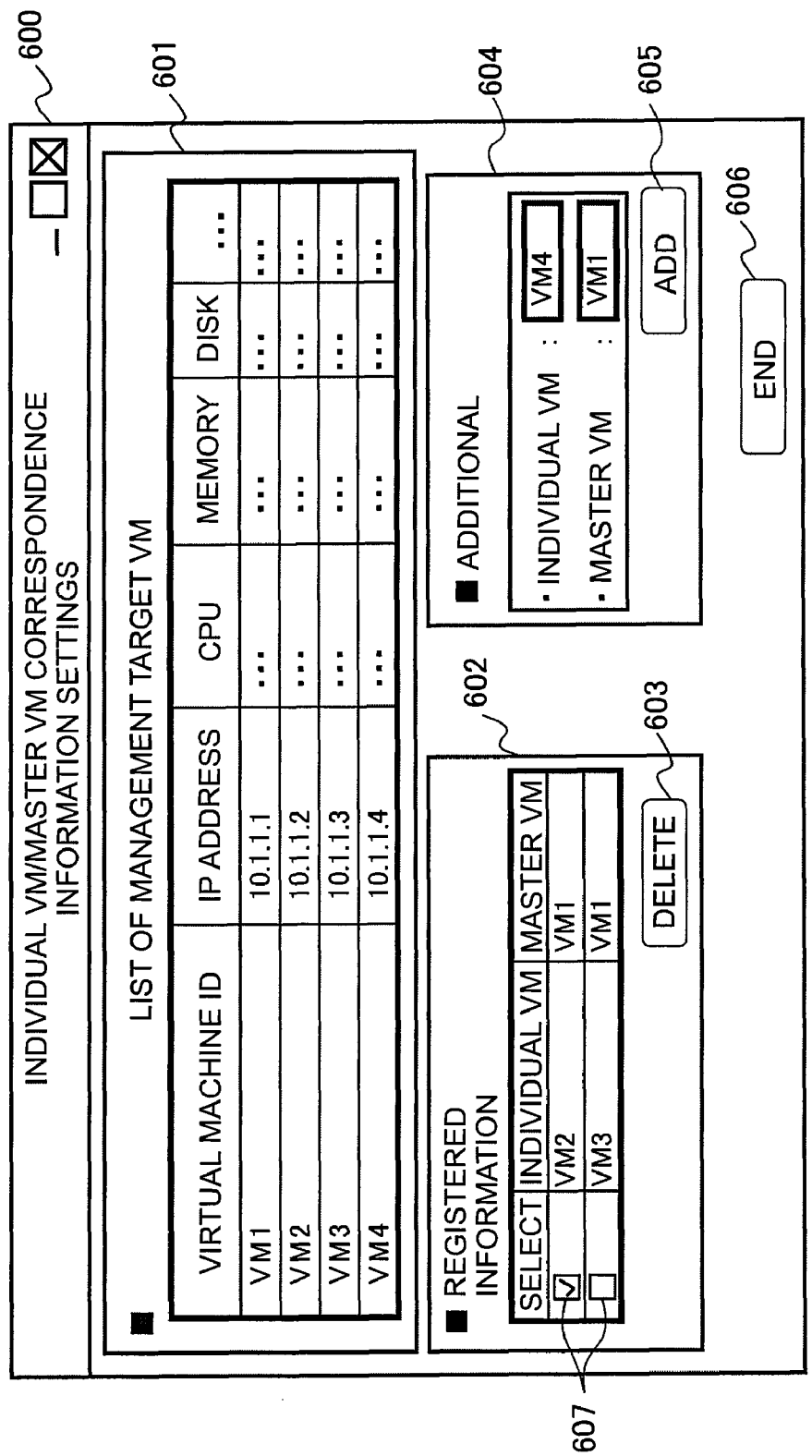
FIG. 15 is a simplified diagram showing an example of the configuration of the setting window corresponding to individual VM/master VM of the first embodiment.

An example of the configuration of the individual VM/master VM correspondence setting window is shown in FIG. 15. The individual VM/master VM correspondence setting window 600 shown in FIG. 15 comprises a management target VM list display portion 601 for displaying a management target virtual client acquired from the client management table 223; a registered information display portion 602 for showing the relationship between an individual VM and a master VM registered in the individual VM/master VM correspondence management table; and a correspondence information additional setting portion 604 for specifying an additional correspondence between an individual VM and master VM.

When a Delete button 603 is clicked in a state in which a check box 607, which corresponds to any corresponding relationship of the corresponding relationships of the individual VM and master VM displayed in the registered information display portion 602, has been checked, the setting program 211 deletes the information related to the corresponding relationship between this individual VM and master VM from the individual VM/master VM correspondence management table 221.

Further, when an Add button 605 is clicked subsequent to an individual VM and master VM pair being specified in the correspondence information additional setting portion 604, the setting program 211 adds the specified information to the individual VM/master VM correspondence management table 221.

When an End button 606, which is displayed at the bottom right of the individual VM/master VM correspondence setting window 500, is clicked, the setting program 211 closes this individual VM/master VM correspondence setting window 500 and ends the process.

(1-6-3) Security Check Program Processing

Next, the contents of security check program 213 processing in Step SP105 of FIG. 12 will be explained. As described hereinabove, the security check program 213 receives from the security management control program 210 the check ID created in Step SP102, the date/time data acquired in Step SP103, and the interval time (=T) of the repeated processing of Steps SP105 through SP108.

Figure 16:
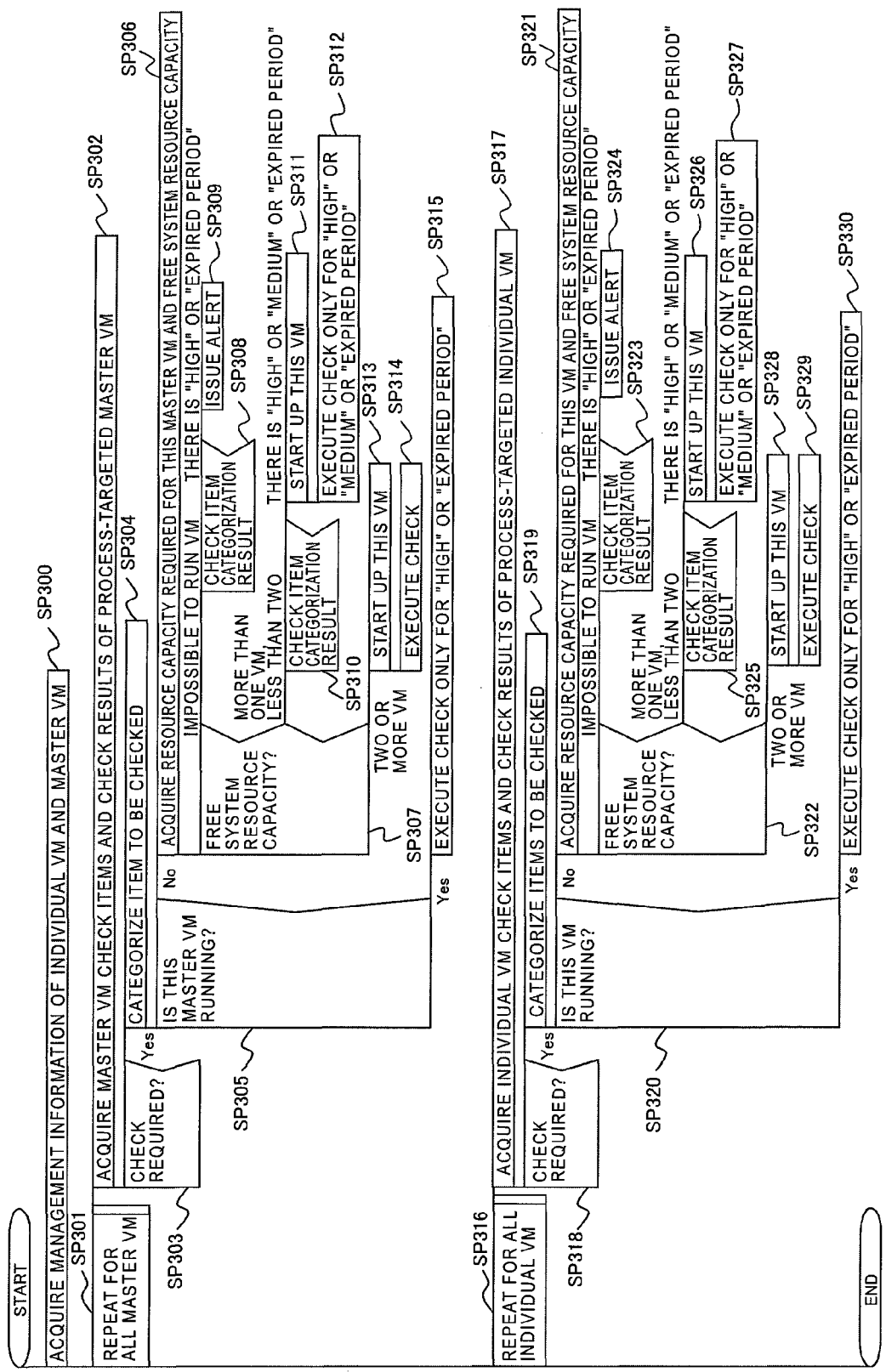
FIG. 16 is a PAD diagram showing the processing steps of the security check process of the first embodiment.

FIG. 16 shows the processing steps of the security check process executed by the security check program 213 of the security management server 101. The security check program 213 first acquires the management information of the respective virtual clients by referencing the client management table 223, references the individual VM/master VM correspondence management table 221, and categorizes the acquired management information of the respective virtual clients as to individual VM management information and master VM management information (SP300).

Next, the security check program 213 acquires, from among the management information categorized in Step SP300, the master VM management information, and repeatedly executes the below-described Steps SP302 through SP315 for all master VM (SP301).

Specifically, the security check program 213 acquires information related to a master VM check item from the check policy management table 220, and, from among the check results of the master VM targeted at this time, acquires the result of the current security check (that is, the entry information that coincides with the check ID) from the check result management table 222.

Next, the security check program 213 references the master VM check item acquired in Step SP302 and the check result of the security check of the master VM targeted at this time, and determines if an unchecked check item exists (SP303).

The security check program 213, upon obtaining a negative result in this determination, returns to Step SP301.

When an affirmative result is obtained in Step SP303, the security check program 213 then, based on the priorities set in the check policy management table 220, categorizes the unchecked check items of the targeted master VM into check items of "high" priority, check items of "medium" priority, and check items of "low" priority. The security check program 213 also lists up expired-check-period check items based on information related to the date/time information acquired from the security management control program 210, the current date/time, and the check period set in the check policy management table 220 (SP304). As for the period expiration determination, in a case where a time arrived at by adding the time period recorded in the check period to the time extracted in SP103 and stored in the memory 202 (that is, the start time of the series of check processes) is older than the current time, the check period is determined to have expired. Furthermore, in this embodiment, the check period is described as a period of time that elapses from the start time of a series of check processes, but the expiration of the check period may also be determined when a UNIX (registered trademark) time period (the number of seconds from Jan. 1, 1970 at 0 hours, 0 minutes, 0 seconds) or a specific date/time are recorded, and the time recorded in the check period is older than the current time. In accordance with this, a virtual client that has passed the security check of this check item need not have the security check executed for the same item again.

The security check program 213 acquires information stored in the virtual machine management table 420 by the management information reference program 412 of the VM management server 103 and information stored in the physical machine management table 421, and, based on this information and the virtual machine management table 420, also determines whether or not the targeted master VM is currently running (S2305). Furthermore, when a prescribed VM is suspended, this refers to a state in which the hypervisor program 310 ends the execution of the application program, OS or other software running on the prescribed VM, and frees up the area of the main memory 302 of the physical client 102 that had been used to provide the prescribed VM, i.e., the state in which the so-called prescribed VM has ended (the state prior to the initialization of the prescribed VM). However, a case where the prescribed VM is suspended in this embodiment may also include a temporary suspended state in which the hypervisor program 310 writes the contents of the prescribed VM-provided register and memory space back to the machine image, and ends the execution of the application program, OS and other such software running on the prescribed VM. In order to restart the processing and run the temporarily suspended VM once again, the hypervisor program 310 reads in various types of information from the VM machine image, such as the contents of the memory space and the contents of the register, and based on the contents thereof, restores the register and memory space contents of the prescribed VM, making it possible to recommence software execution as a VM. Therefore, in a case applying to a temporarily suspended VM, the process for virtual machine (virtual client) emulation noted in the explanation of the hypervisor program 310 may also be read as the carrying out of the above-mentioned restoration.

When a negative result is obtained via this determination, the security check program 213 then acquires the resource capacity required for this master VM on the basis of the information of the virtual machine management table 420 acquired in Step SP305. Additionally, the security check program 213 also acquires the capacities (called the required resource capacity hereinafter) of the various resources (CPU, memory, disk, etc.) required in the respective physical clients (the first and second physical clients 102A, 102B) from the physical machine management table 421. The security check program 213 also uses an IP address acquired from the same physical machine management table 421 to remotely access the respective physical clients (the first and second physical clients 102A, 102B), acquire the current performance information (CPU utilization rate and amount of memory being used) from the performance information acquisition function 311 of these physical clients, and compute the system resource capacity that is currently free (SP306).

Next, the security check program 213 compares the required resource capacity of the targeted master VM and the currently free system resource capacity acquired in Step SP306, and determines whether or not it is possible to start up this master VM (SP307).

In a case where it has been determined in accordance with this determination that it will not be possible to start up this master VM, the security check program 213 references the categorization results of the unchecked check items for this master VM created in Step SP304 (SP308), and if there is either a check item having a "high" priority or a check item for which the check period has expired, issues an alert to the administrator (SP309). As long as the method for issuing the alert to the administrator is one that notifies the administrator to the effect that there is a shortage of resources, any of a variety of widely used methods may be applied, to include displaying a message on the display 204 or sending an e-mail addressed to the administrator. Then, the security check program 213 returns to Step SP301 and thereafter repeats the same processing.

The security check program 213, in a case where the determination in Step SP307 was that there is not enough resource capacity for two of these master VM (a case where starting up the targeted master VM will mean that other VM will not be able to be run), references the categorization results of the unchecked check items for this master VM created in Step SP304, and determines whether or not there are check items either having a "high" or "medium" priority or having an expired check period (SP310).

Then, when an affirmative result is obtained via this determination, the security check program 213 uses the VM management program 410 of the VM management server 103 to start up this master VM (SP311). Specifically, the security check program 213 reads the corresponding machine image information 320 from the storage device 104 into this hypervisor program 310 in accordance with controlling either the first or second physical clients 102A, 102B, and deploys this information to the main memory 302. However, in a case where there is a shortage of free resources in the physical client (either the first or second physical client 102A, 102B) that will run this master VM, the security check program 213 starts up the master VM subsequent to using the VM migration program 411 of the VM management server 103 to migrate this master VM to the physical client that has the most free resources.

Next, the security check program 213 carries out security checks for the targeted master VM with respect to a check item having a "high" priority, a check item having a "medium" priority, and a check item having an expired check period, and stores the check results thereof in the check result management table 222. For a check item for which the check target is "master", the security check program 213 also stores the check results for this master VM in the check result management table 222 as the check results of a security check of individual VM related to this master VM. Furthermore, for a check item for which the check target is "master or individual", the security check program 213 stores the check results of the security check for this master VM in the check result management table 222 as the check results for individual VM related to this master VM only in a case where the check result shows that the master VM passed this security check (Step SP312). The security check program 213 then returns to Step SP301, and thereafter repeats the same processing.

Furthermore, in a case where the determination in Step SP307 was that there are enough free resources inside the corresponding physical client (either the first or second physical client 102A, 102B) for two or more of the master VM, the security check program 213 uses the VM management program 410 of the VM management server 103 to start up this master VM (Step SP313). In a case where the free resources of the physical client that is to run the master VM (either the first or second physical client 102A, 102B) are insufficient at this time, the security check program 213, similarly to Step SP311, starts up this master VM subsequent to using the VM migration program 411 of the VM management server 103 to migrate this master VM to the physical client having the most free resources.

Next, the security check program 213 carries out a security check for the targeted master VM, and stores the check result thereof in the check result management table 222. The same as in Step SP312, the security check program 213 stores the check results of the security check of this master VM in the check result management table 222 as the check results for individual VM related to this master VM in accordance with the check target setting (SP314). Then the security check program 213 returns to Step SP301 and thereafter repeats the same processing.

The processing of Steps SP307 through SP314 is an example, and, for example, Steps SP308 and SP309 may also be carried out in a case where the determination in Step SP307 is that there are not enough free resources for two of these master VM.

By contrast, when an affirmative result is obtained in the determination of Step SP305, the security check program 213 only carries out a security check for the targeted master VM with respect to a check item having a "high" priority and a check item having an expired check period, and stores the check results thereof in the check result management table 222. In a case where a master VM is started up like this, the reason for carrying out a security check only for a check item having a "high" priority and a check item having an expired check period is so as not to interfere with any processing that could be performed by this master VM when this master VM is running. The same as in Step SP312, the security check program 213 also stores the check results of the security check for this master VM in the check result management table 222 as the check results for individual VM related to this master VM in accordance with the check target setting (SP315). Then, the security check program 213 returns to Step SP301, and thereafter repeats the same processing.

Next, the security check program 213 acquires individual VM management information from the management information categorized in Step SP300, and repeatedly executes the processing of the below-described Steps SP317 through SP330 for all the individual VM (SP316).

Specifically, the security check program 213 acquires information related to the check item of an individual VM from the check policy management table 220, and, from among the check results of the individual VM targeted at this time, also acquires the results of the current security check process (that is, the entry information that coincides with the check ID) from the check result management table 222 (SP317).

Next, the security check program 213 references the check item of the security check for the individual VM acquired in Step SP317 and the check result of the security check for the individual VM targeted at this time, and determines if an unchecked check item still exists (SP318).

The security check program 213 returns to Step SP316 upon obtaining a negative result in this determination.

When an affirmative result is obtained in Step SP318, the security check program 213 then lists up, similarly to Step SP304, the unchecked check items for the targeted individual VM (SP319).

Next, the same as in Step SP305, the security check program 213 determines whether or not the targeted individual VM is running (SP320), and when this individual VM is running, respectively acquires the required resource capacity of this individual VM and the current performance information of the physical client, and computes the system resource capacity that is currently free the same as in Step SP306 (SP321).

Next, the security check program 213 determines whether or not it is possible to start up this individual VM the same as in Step SP307 (SP322).

In a case where it has been determined that it will not be possible to start up this individual VM, if there is either a check item having a "high" priority or a check item for which the check period has expired among the unchecked check items of this individual VM, the security check program 213 then issues an alert to the administrator the same as in Step SP308 (SP323, SP324). Then the security check program 213 returns to Step SP316, and thereafter repeats the same processing.

In a case where the determination in Step SP322 is that there are not enough free resources for two of these master VM (a case where running the targeted master VM will mean that other VM will not be able to be run), the security check program 213 also references the categorization results of the unchecked check items for this individual VM created in Step SP319, and determines whether or not there are check items either having a "high" or "medium" priority or having an expired check period (SP325).

Then, when an affirmative result is obtained via this determination, the security check program 213 starts up this individual VM the same as in Step SP311 (SP326).

The security check program 213 also carries out a security check for this individual VM only in respect to the check items having a "high" or "medium" priority and the check item having an expired check period, and stores the check results thereof in the check result management table 222 the same as in Step SP312 (SP327). Then, the security check program 213 returns to Step SP316, and thereafter repeats the same processing.

Furthermore, in a case where the determination in Step SP322 is that there are enough free resources inside the corresponding physical client (either the first or second physical client 102A, 102B) for two or more of these master VM, the security check program 213 starts up this individual VM using the same procedure as in Step SP313 (SP328), and thereafter carries out a check for this individual VM using the same procedures as in Step SP314, and stores the check results in the check result management table 222 (SP329). The security check program 213 then returns to Step SP316, and thereafter repeats the same processing.

By contrast, when an affirmative result is obtained in the determination of Step SP320, the security check program 213 carries out a security check for this individual VM only with respect to the check item having a "high" priority and the check item having an expired check period, and stores the check results thereof in the check result management table 222 the same as in Step SP315 (SP330). Then, the security check program 213 returns to Step SP316, thereafter repeats the same processing, and when the processing of Steps SP317 through SP330 eventually ends for all the individual VM, ends this security check process.

(1-6-4) VM Information Collection Program Processing

Next, the contents of the processing of the VM information collection program 212 (FIG. 2) of the security management server 101 (FIG. 2) will be explained.

Figure 17:
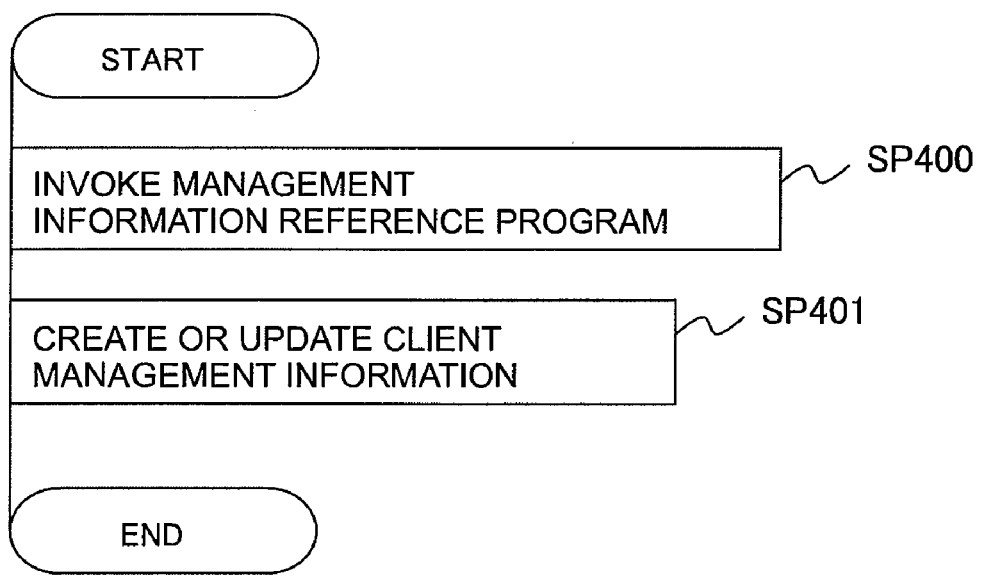
FIG. 17 is a PAD diagram showing the processing steps of a VM information collection process.

FIG. 17 shows the processing steps of the VM information collection process executed by the VM information collection program 212 in accordance with this embodiment. The VM information collection program 212 first invokes the management information reference program 412 of the VM management server 103, and acquires the respective virtual machine management information (called the virtual machine management information hereinafter) from the virtual machine management table 420 (SP400).

Next, the VM information collection program 212 stores either part or all of the acquired virtual machine management information in the client management table 223 (SP401). Thereafter, this VM information collection process ends.

(1-7) Working and Effect of this Embodiment

Figure 18:
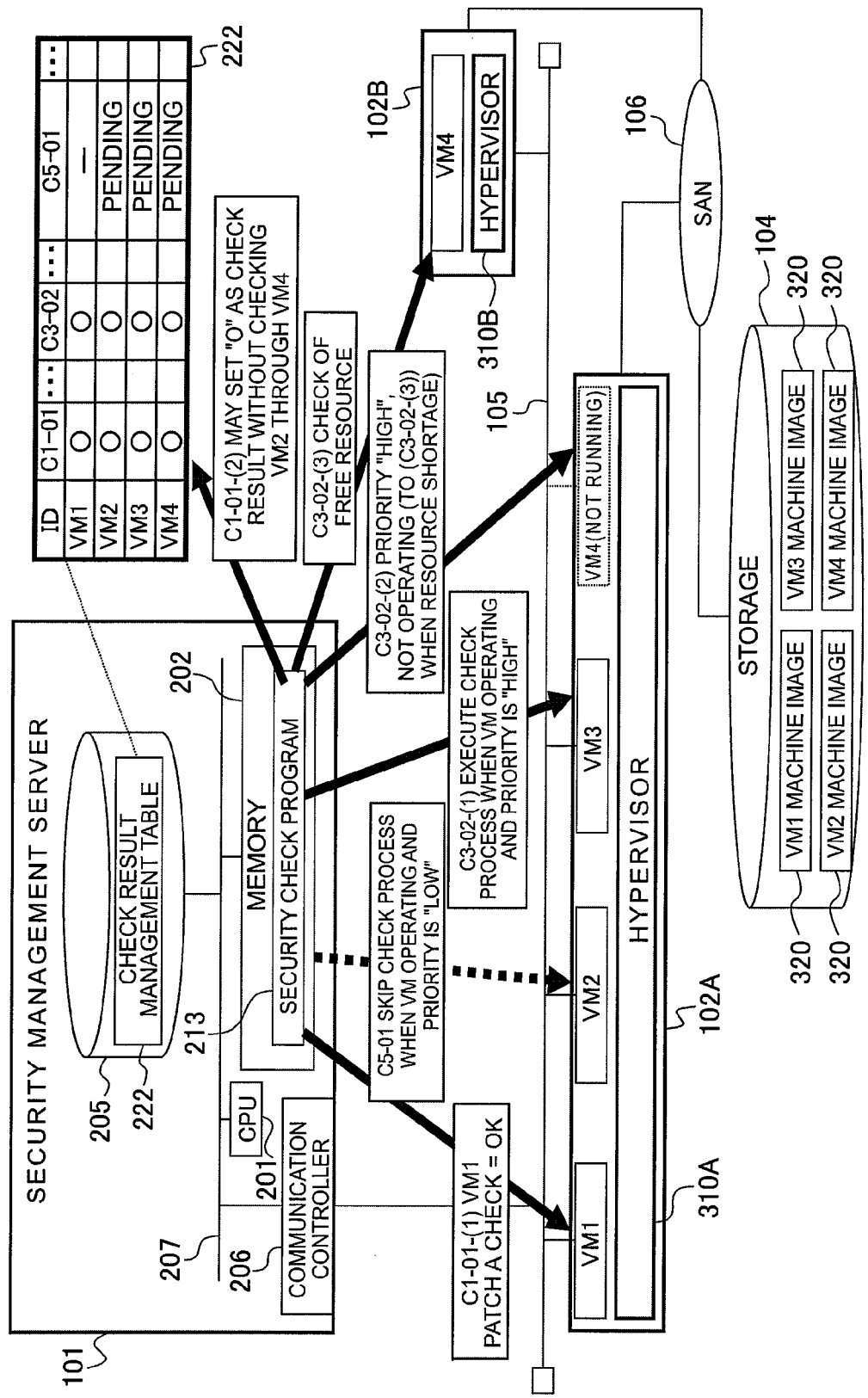
FIG. 18 is a diagram showing an example of the working of the first embodiment.

An example of the working of this embodiment is shown in FIG. 18. For example, check item "C1-01" in the check policy management table 220 is implemented for virtual machine VM1, and in a case where virtual machine VM1 passes the check ("C1-01-(1)" in FIG. 18), it is possible to set the check result for each individual VM to "0" without carrying out checks for the individual VM (VM2 through VM4) ("C1-01-(2)" in FIG. 18). Consequently, it is possible to speed up the security check process while shortening the throughput of the security check process and reducing the impact on the virtual client user.

In a case where check item "C5-01" in the check policy management table 220 is implemented for virtual machine VM2, the priority of this check item "C5-01" is "low" if virtual machine VM2 is in use, so the check is skipped, but the check process is carried out later when the virtual machine VM2 is not being used ("C5-01" in FIG. 18). Consequently, it is possible to reduce the impact of the security check process on the user of virtual machine VM2.

In a case where check item "C3-02" in the check policy management table 220 is implemented for virtual machine VM3, the priority of this check item "C3-02" is "high" so the check process for this check item is implemented despite the fact that virtual machine VM3 is in use ("C3-02-(1)" in FIG. 18). Similarly, if there is a shortage of resources in the first physical client 102A when check item "C3-02" is implemented for virtual machine VM4 ("C3-02-(2)" in FIG. 18), virtual machine VM4 is migrated to the second physical client 102B before the check process is implemented ("C3-02-(3)" in FIG. 18). Consequently, it is possible to carry out a check quickly for a high-priority check item.

According to the above-described security management method of this embodiment, since it is possible to selectively execute a security check for a virtual machine of a required type by check item, an unnecessary security check for a virtual machine of a type that is not required may be omitted. In this way, it is possible to carry out a virtual client security check quickly and efficiently.

According to the prior art, the problem is that a considerable load is placed on the check-targeted client side as well as on the management server side that is carrying out the check process by virtue of the execution of a security check for the virtual clients, but in accordance with the security management method of this embodiment, it is possible to realize increased speed using a method that shortens the throughput of the security check rather than a method that increases speed via parallel execution by a plurality of management servers.

(2) Second Embodiment (2-1) Network System Configuration According to this Embodiment Next, a second embodiment will be explained. This embodiment is based on virtualization technology (for example, the technology of Patent Document 2 or Non-Patent Document 1) whereby a plurality of management-targeted virtual clients share machine configuration information (either all or part of a certain machine image), and when a change is made to the shared machine configuration information, this change is reflected in all of the virtual clients that are sharing this machine configuration information, particularly virtualization technology whereby a change added to shared machine configuration information is not reflected in a virtual client that is already running, but rather, this change is reflected when the OS of the virtual client is rebooted. Furthermore, an OS reboot is not only a case where the OS processing of a running virtual client is ended and rebooted, but rather also includes a case where the virtual client transitions to the suspended state subsequent to the termination of this virtual client's OS, and thereafter the virtual client is started up and the OS boots up. A method realized in accordance with the following processing is considered an example of virtualization technology that reflects a change in this manner. However, a method other than this may also be used.

(Step 1) Records a change in the master VM. The change recording method records the specified change in accordance with the individual filenames that were changed or the file system addresses of the change. A different method for specifying a change may also be used. Updated data and pre-update data may also be recorded. This recording may be carried out by the hypervisor program, a master VM or another computer.

(Step 2) Detects the rebooting of the individual VM OS, and copies the recorded change data from the master VM disk image to the individual VM disk image. This detecting and copying may be carried out by the hypervisor program, the master VM, or a different computer. If the above-mentioned copy is inconsistent with either a file or setting that only exists in individual VM, the copying of the file (or data) containing the inconsistency will be suppressed.

(Step 3) Starts up the individual VM OS subsequent to copying. The software execution environment for reflecting the copied file (data) is thereby realized on the individual VM.

However, the present invention may be applied within the scope of the first embodiment as virtualization technology that does not require the rebooting of the virtual client in order to reflect a change in the shared information.

Since this embodiment does not depend on the implementation of the above-mentioned virtualization technology, a detailed explanation of virtualization technology will be omitted, and the explanation will be limited simply to an example. Further, the above-mentioned virtualization technology comprises technology, in which the shared machine configuration information is the machine image itself and a virtual machine is able to be configured by shared machine configuration information alone (called virtualization technology 1 hereinafter), and technology whereby a virtual machine is not configurable via shared machine configuration information alone, but an individual virtual client is configurable by combining the shared machine configuration information with the individual machine configuration information possessed by each individual virtual client (called virtualization technology 2 hereinafter). In this embodiment, a system that makes it possible to support both virtualization technology 1 and virtualization technology 2 like this will be explained.

Figure 19:
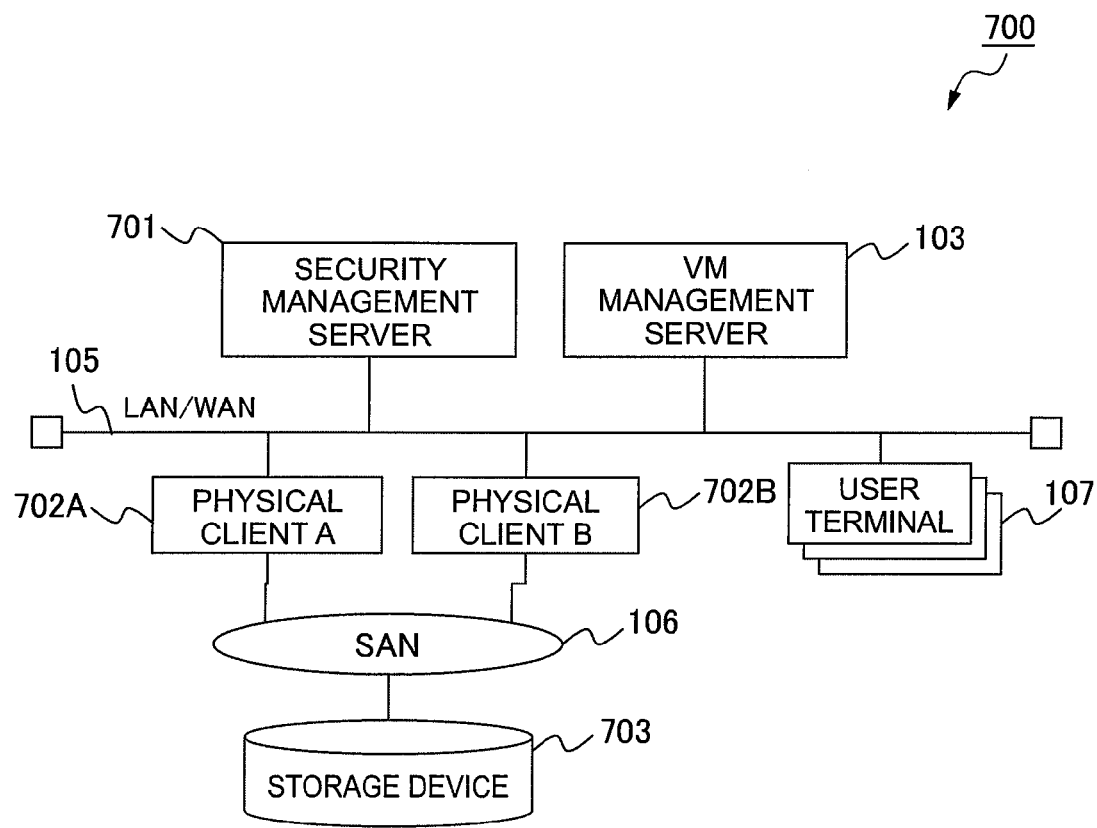
FIG. 19 is a block diagram showing the overall configuration of a network system of a second embodiment.

In FIG. 19, in which parts corresponding to FIG. 1 have been assigned the same reference numerals, 700 denotes an entire network system according to the second embodiment. This network system 700 is configured the same as the network system 100 according to the first embodiment except for the different programs and types of information held in the external storage device 303 of the first and second physical clients 702A, 702B (FIG. 20) and the storage device 703, and the check items of the security check executed by the security management server 701 and the processing steps of this security check.

Figure 20:
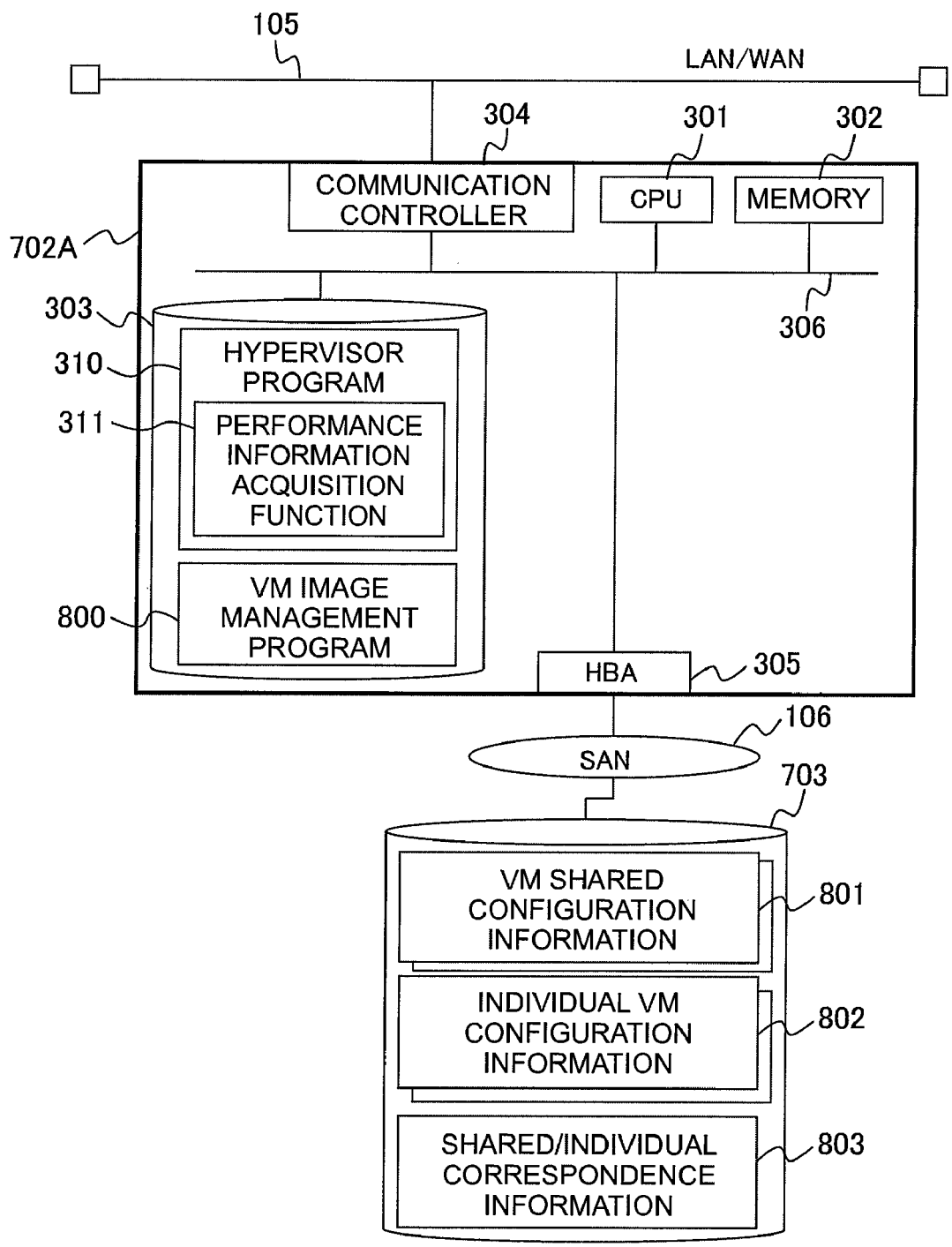
FIG. 20 is a block diagram showing the configuration of a physical client according to the second embodiment.

First, the configurations of the first and second physical clients 702A, 702B according to this embodiment will be explained. FIG. 20, in which parts corresponding to FIG. 7 have been assigned the same reference numerals, shows the configuration of the first physical client 702A in accordance with the second embodiment. The configuration of the second physical client 702B is the same as that of the first physical client 702A.

The external storage device 303 of the first physical client 702A holds a VM image management program 800 in addition to the hypervisor program 310. Further, a storage device 703 stores either one or a plurality of VM shared configuration information 801, one or a plurality of individual VM configuration information 802, and shared/individual correspondence information 803.

The VM shared configuration information 801 is either a portion or all of the information for configuring either one or a plurality of virtual clients, and typically is shared among a plurality of virtual clients. In the above-mentioned virtualization technology 1, the VM shared configuration information 801 is the machine image of a certain virtual client, and in the above-mentioned virtualization technology 2, the VM shared configuration information 801 is a portion of the information for configuring a certain virtual client.

The individual VM configuration information 802 is a portion of the information for configuring a virtual client, such as customized information for each individual virtual client. In the above-mentioned virtualization technology 1, the individual VM configuration information 802 is the difference information with respect to a virtual client configured from only the VM shared configuration information 802, and in the above-mentioned virtualization technology 2, the individual VM configuration information 802 is information that is combined with the VM shared configuration information 801 to configure a certain virtual client.

The shared/individual correspondence information 803 is information denoting the VM shared configuration information 801 respectively associated to the individual VM configuration information 802.

The VM image management program 800 manages the VM shared configuration information 801 and the individual VM configuration information 802, and provides a virtual machine image to the hypervisor program 310. That is, the hypervisor program 310 in this embodiment accesses the machine image by way of the VM image management program 800.

For example, the VM image management program 800, based on the shared/individual correspondence information 802, virtually constructs a machine image that combines the VM shared configuration information 801 and the individual VM configuration information 802. In a case where there has been a change to certain VM shared configuration information 801, the VM image management program 800 also manages both the pre-change information and the post-change information until confirming that the post-change information has been reflected in all of the virtual clients (that is, until the pre-change information in no longer required), and provides either the pre-change or the post-change in accordance with a hypervisor program 310 request.

(2-2) Logical Configuration

Next, the portion of the logical configuration of network system 700 according to this embodiment that differs from the logical configuration of network system 100 according to the first embodiment described hereinabove (refer to FIG. 11) will be explained. In this embodiment, it is supposed that the VM shared configuration information 801 is a machine image having sufficient information to start up a virtual machine using only this information as in the above-mentioned virtualization technology 1.

Figure 21:
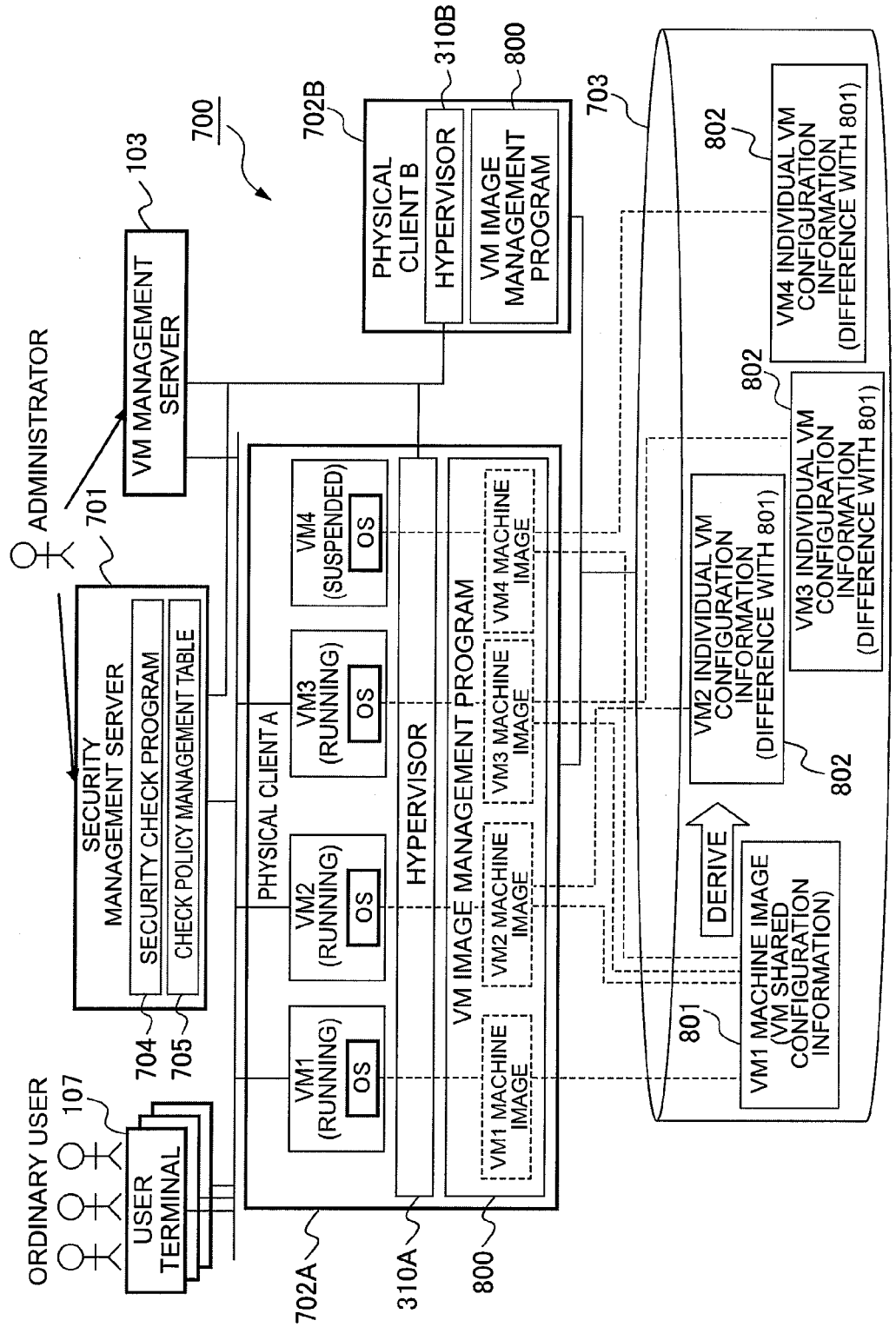
FIG. 21 is a diagram showing the logical configuration of the network system according to the second embodiment.

FIG. 21 shows a logical configuration of the network system 700 according to the second embodiment. The storage device 703 stores VM shared configuration information 801, and individual VM configuration information 802 (difference information with respect to the VM shared configuration information 801) for the respective virtual clients (second through fourth virtual clients VM2 through VM4) other than the first virtual client VM1.

As mentioned above, the VM shared configuration information 801 is a machine image having sufficient information to start up the first virtual client VM1 using this information alone, but a configuration, in which individual VM configuration information 802 for the first virtual client VM1 is stored in the storage device 703, and the first virtual client VM1 has sufficient information to start up a virtual machine by combining the VM shared configuration information 801 with the individual VM configuration information 802 for this first virtual client VM1, may also be adopted.

The second through fourth virtual clients VM2 through VM4 are virtual machines created on the basis of the first virtual client VM1, and the machine images of these second through fourth virtual clients VM2 through VM4 are virtually configured by combining the VM shared configuration information 801 with the individual VM configuration information 802 for the respective virtual clients in accordance with the VM image management program 800.

In this embodiment, except for uninstalling software that has been installed in the master VM, it is supposed that the user of an individual VM has permission to carry out all sorts of operations. Methods for inhibiting the uninstallation of software include an uninstallation prohibited setting in the registry, safeguards in accordance with user privileges for users of individual VM, and an uninstallation password setting, but other methods may also be used.

Further, the fact that the first virtual client VM1 is the master VM for all of the second through fourth virtual clients VM2 through VM4 is registered in the individual VM/master VM correspondence management table 221 (FIGS. 2 and 4), which is held by the security management server 701 the same as in the first embodiment.

As mentioned above, in this embodiment, the VM shared configuration information 801 is a machine image having sufficient information to start up the first virtual client VM1 using only this information, but in a case where the configuration is such that the first virtual client VM1 has sufficient information to start up a virtual client by combining the VM shared configuration information 801 with the individual VM configuration information 802 for this first virtual client VM1, any of the individual VM, that is, any of the second through fourth virtual clients VM2 through VM4 is also defined as the master VM. Specifically, for example, the second virtual client VM2 is defined as a master VM and an individual VM, and the second virtual client VM2 is respectively registered in the individual VM/master VM correspondence management table 221 as the master VM for the second through fourth virtual clients VM2 through VM4.

(2-3) Processing Steps

Next, the check policy in this embodiment will be explained. FIG. 22 shows an example of the configuration of a check policy management table 705 held by the security management server 701 of this embodiment.

In a case where a master VM passes a security check, it is necessary to confirm that a change in the master VM is also reflected in individual VM with respect to a check item for which a security check is not carried out for individual VM (that is, for a check item having a check target of either "master" or "master or individual"). That is, the individual VM OS must be rebooted in order for the master VM change to be reflected in the running individual VM.

Accordingly, the check policy of this embodiment has a check item called "reflect master change" added to the contents of the check policy of the first embodiment. This check item is for checking whether or not a change in the master VM has been reflected in individual VM. Furthermore, the "check target" and "priority" of this check item are respectively fixed at "individual" and "high", and it is not possible to change this "check target" and "priority". Also, unlike the "check period" of other check items, the "check period" for this check item signifies an "action period" rather than a period for executing a security check.

Figure 23:
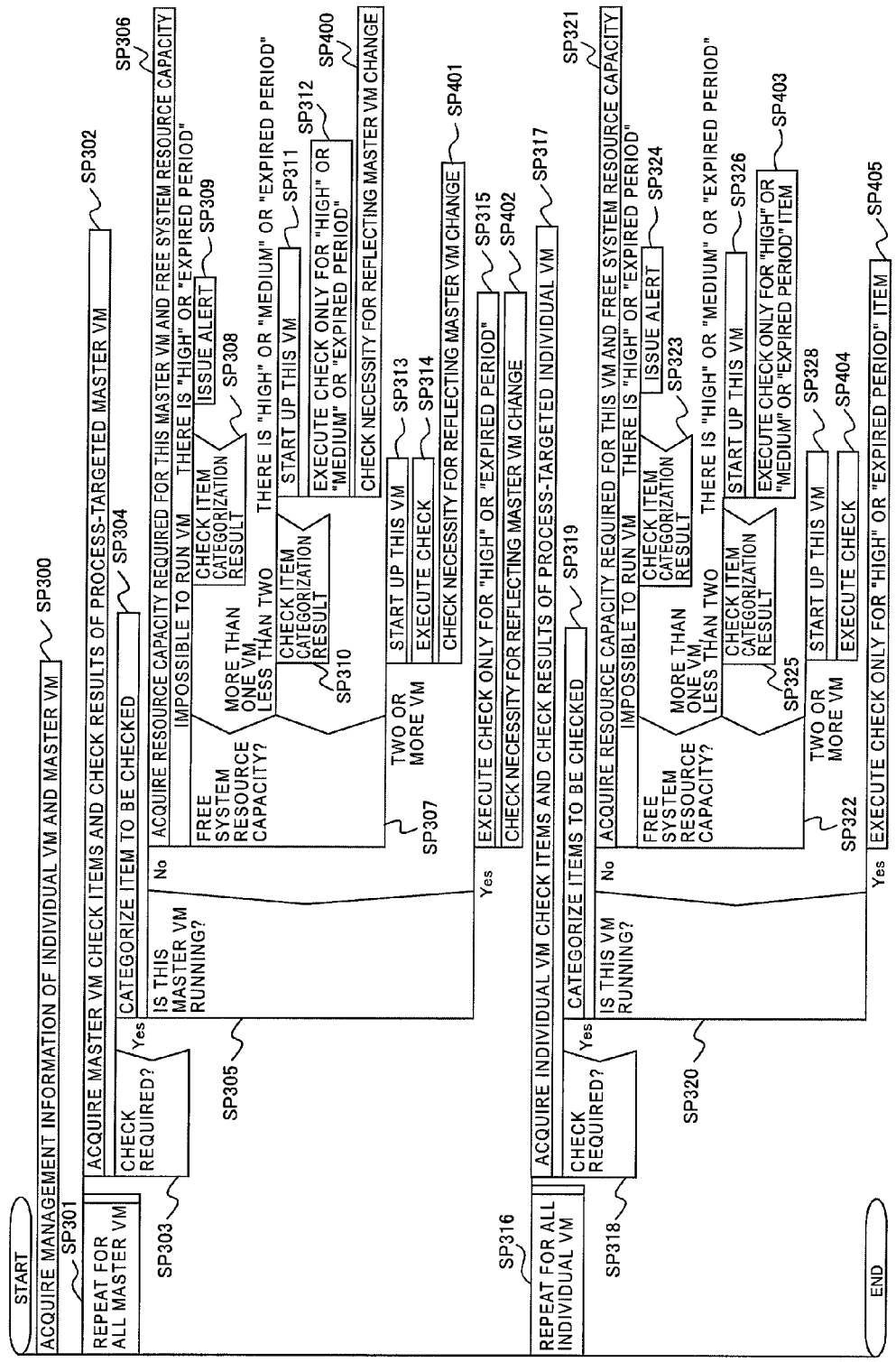
FIG. 23 is a PAD diagram showing the processing steps of the security check process of the second embodiment.

The processing steps of the security check program 213 of this embodiment will be explained. The security check process of this embodiment, as shown in FIG. 23, in which parts corresponding to FIG. 16 have been assigned the same reference numerals, adds Steps SP400, SP401 and SP402 after Steps SP312, SP314, and SP315, respectively, of the security check process according to the first embodiment.

Further, in the security check process of this embodiment, a security check related to the check item "reflect master change", which has been added to the check policy as mentioned above, is implemented subsequent to executing the same processing as that of Steps SP327, SP329 or SP330 corresponding to the security check of the first embodiment in Steps SP403, SP404 and SP405 after Steps SP326, SP328 and SP320, respectively.

First, the contents of the processing of the security check program 704 (FIG. 21) of the security management server 701 in the added Steps SP400, SP401 and SP402 will be explained.

The security check program 704 of this embodiment, subsequent to the processing of Step SP312, compares the check result of the preceding security check against the check result of the current security check for the check item implemented in Step SP312. Then, in a case where the check item for which the preceding security check failed but the current security check passed, the security check program 704 determines that the change in the master VM must be reflected, and acquires from the OS 214 the current date/time as the date/time of the master VM change (SP400). The security check program 704 executes this same processing in Step SP401 for the check item implemented in Step SP314, and in Step SP402 for the check item implemented in Step SP315.

Next, the contents of the processing of the security check program 704 in Steps SP403, SP404 and SP405 will be explained.

The security check program 704, in Step SP403, carries out a check only for a check item having a priority of "high", a check item having a priority of "medium" and a check item having an expired check period with respect to the processing-targeted individual VM, the same as in Step SP327 of FIG. 16.

However, executing a security check for the check item "reflect master change" is limited to a case where the result of this reflect master VM change yes/no determination carried out in Step SP400, Step SP401 or Step SP402 is that the change to the master VM must be reflected.

This security check method, for example, references log information, such as an event log of check targeted individual VM or a syslog, acquires the date/time of the last reboot, and determines whether or not a reboot has been carried out on or after the date/time of the master VM change, which was acquired in the above-mentioned Step SP400, Step SP401 or Step SP402.

In a case where the check result shows that this security check failed, the security check program 704 compares the date/time of the master VM change against the current time, and issues an alert if the specified period has expired.

Subsequent to the same processing as that of Steps SP329 and SP330 of the first embodiment being respectively carried out in Steps SP404 and SP405, the check process for the check item "reflect master change" described with respect to Step SP403 is executed.

The check period item of the check policy management table of the security management method of this embodiment sets a setting value for inhibiting commencement of a forced check with respect to the master VM and individual VM prior to the expiration of this period as described in the first embodiment, and, additionally sets a setting value for commencing a prescribed process (the issuance of an alert hereinabove) for urging a reboot if the presence or absence of an OS reboot has been repeatedly checked and there has still not been a reboot even after the expiration of the action period.

Furthermore, in this embodiment, an explanation was given of an example in which the time at which the security check program 213 detected the change in the master VM is regarded as the time of the master VM change, and a determination is made on the basis of this time as to whether or not the individual VM were rebooted within the action period, but the determination as to the expiration of the period may also be determined based on the actual date/time at which the change occurred in the master VM. For example, the security management server may acquire the date/time of the change to the master VM from the hypervisor program 310 of the physical client 702 on which the master VM is running, or the VM image management program 800, or the VM management server, and compare the date/time that adds the action period to this change date/time against the current date/time.

(2-4) Effect of this Embodiment

According to the above-mentioned security management method of this embodiment, it is possible to carry out the same security management as in the first embodiment even for a network system 700 employing virtualization technology that does not reflect a change in an already running virtual client when a change has been applied to the master VM configuration information, but rather, reflects this change when the virtual client is rebooted.

(3) Third Embodiment

Figure 24:
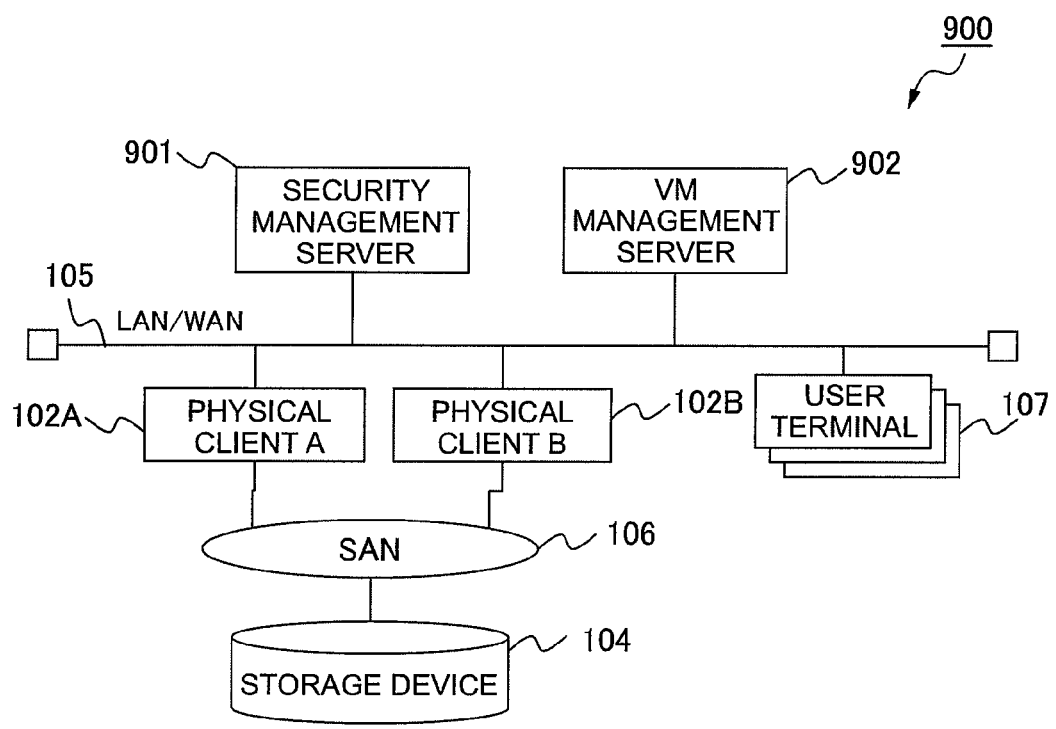
FIG. 24 is a block diagram showing the overall configuration of a network system of a third embodiment.

Next, a third embodiment will be explained. FIG. 24, in which parts corresponding to those of FIG. 1 have been assigned the same reference numerals, shows a network system 900 according to the third embodiment. This network system 900 is configured the same as network system 1 according to the first embodiment except that this system automatically determines the check target set in the check policy based on system environment information.

Figure 25:
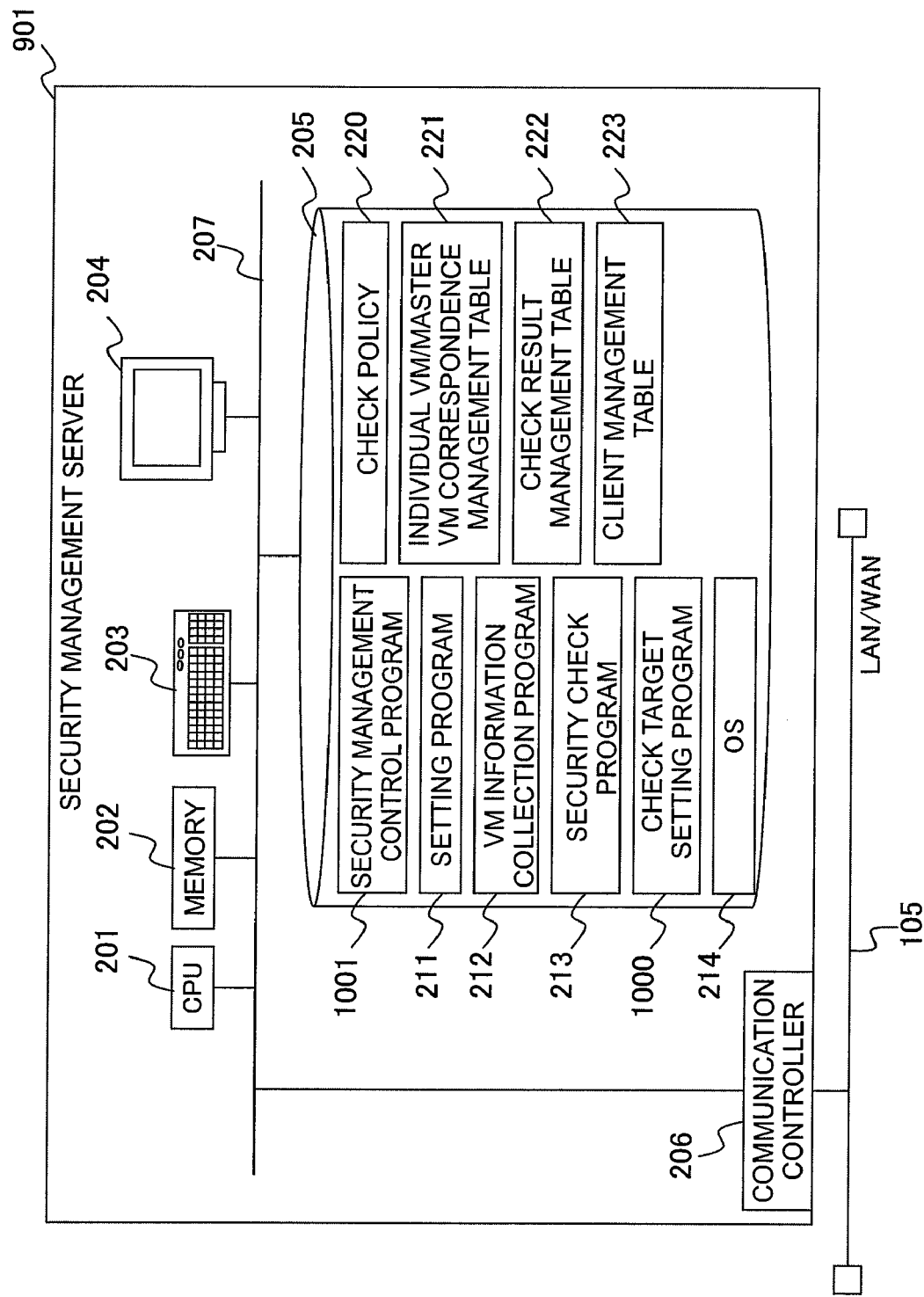
FIG. 25 is a block diagram showing the configuration of a security management server according to the third embodiment.

FIG. 25, in which parts corresponding to those of FIG. 2 have been assigned the same reference numerals, shows a security management server 901 of this embodiment. This security management server 901 is configured the same as the security management server 901 according to the first embodiment except that a check target setting program 1000 is stored in the external storage device 205 in addition to the various programs and information described above with respect to FIG. 2, and that a function for automatically determining the check target set in the check policy based on system environment information is provided in a security management control program 1001.

The check target setting program 1000 is for examining an item that enables customization of an individual VM based on system environment information and an item that does not enable such customization, makes the master VM the check target for an item that is not customizable for individual VM, makes individual VM the check target for a customizable item, and sets same in the check policy management table 220.

Methods for acquiring environment information for determining the propriety of customization may include acquiring the environment information from master VM registry information, or ascertaining privileges of the user the privileges of the user using the individual VM, but in this embodiment, the pros and cons of customization are determined in accordance with querying a VM management server 902.

Figure 26:
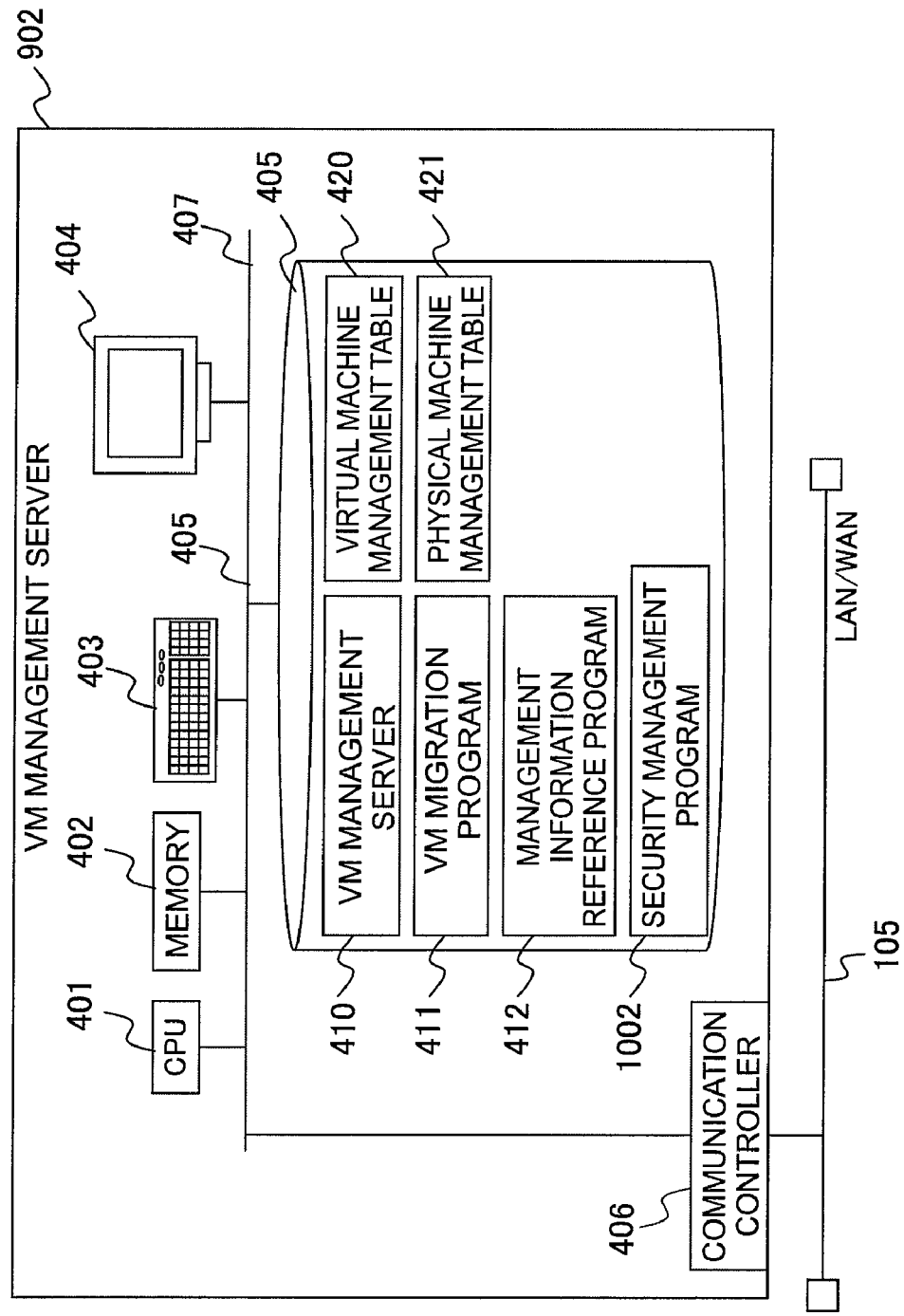
FIG. 26 is a block diagram showing the configuration of a VM management server according to the third embodiment.

FIG. 26, in which parts corresponding to those of FIG. 8 have been assigned the same reference numerals, shows the configuration of the VM management server 902 of this embodiment. This VM management server 902 is configured the same as the VM management server 103 according to the first embodiment except that a security management program 1002 is stored in the external storage device 405 in addition to the various programs and information described hereinabove using FIG. 8.

The security management program 1002 is for making it possible to set security-related utilization restrictions for a virtual client created by this VM management server 902, and for restoring the above-mentioned restricted use information in accordance with an instruction from a user utilizing the instruction input device 403, and an instruction from another program by way of the network 105.

FIG. 27 shows a check policy setting window 1100 displayed by the security management server 901 of this embodiment. The check policy setting window 1100 of this embodiment differs from the check policy setting window 500 according to the first embodiment in that it is possible to specify "automatic" in addition to "master", "individual", "master or individual" and "master and individual" as the check target. In a case where "automatic" is specified as the check target, the security management control program 1001 of the security management server 901 automatically determines on the basis of system environment information whether or not customization of the individual VM is possible for the check item thereof, and specifies a check target.

Next, the processing steps of the security management control program 1001 related to the process for automatically determining the check target set in the check policy based on system environment information as mentioned hereinabove will be explained.

Figure 28:
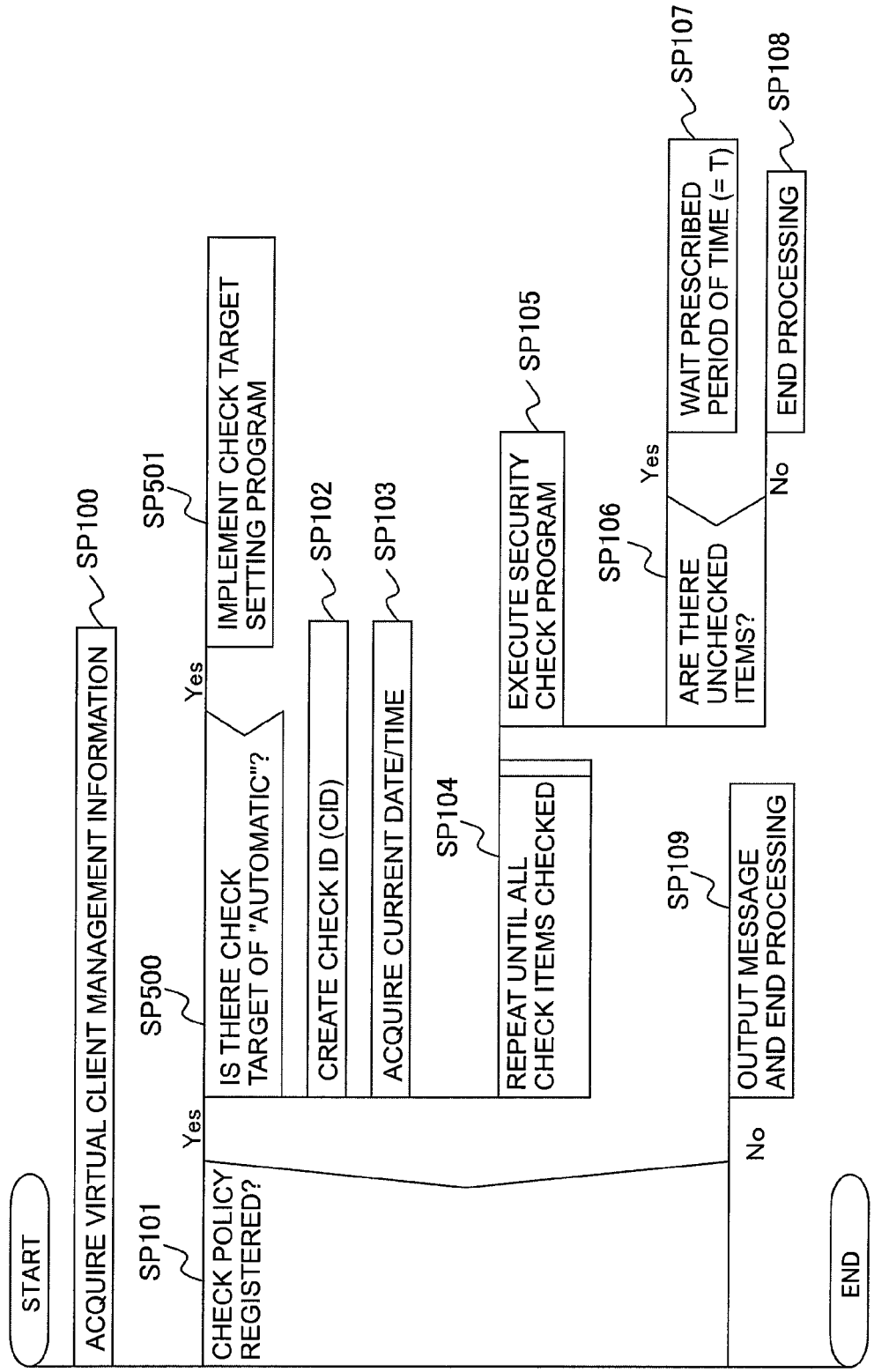
FIG. 28 is a PAD diagram showing the processing steps of a security management control process of the third embodiment.

FIG. 28, in which parts corresponding to those of FIG. 12 have been assigned the same reference numerals, shows the processing steps of the security management control process of this embodiment. The security management control process according to this embodiment differs from the security management control process according to the first embodiment in that the processing of Steps SP500 and SP501 is executed prior to executing the processing of Step SP102.

In this case, the security management control program 1001, upon proceeding to Step SP500, ascertains if "automatic" has been selected as the check target of the check policy, and in a case where "automatic" has been selected, proceeds to Step SP501. In Step SP501, the security management control program 1001 automatically determines the check target in accordance with executing the check target setting program 1000, and sets a value such as "master" or "individual" in the "automatic" portion set in the check policy.

Figure 29:
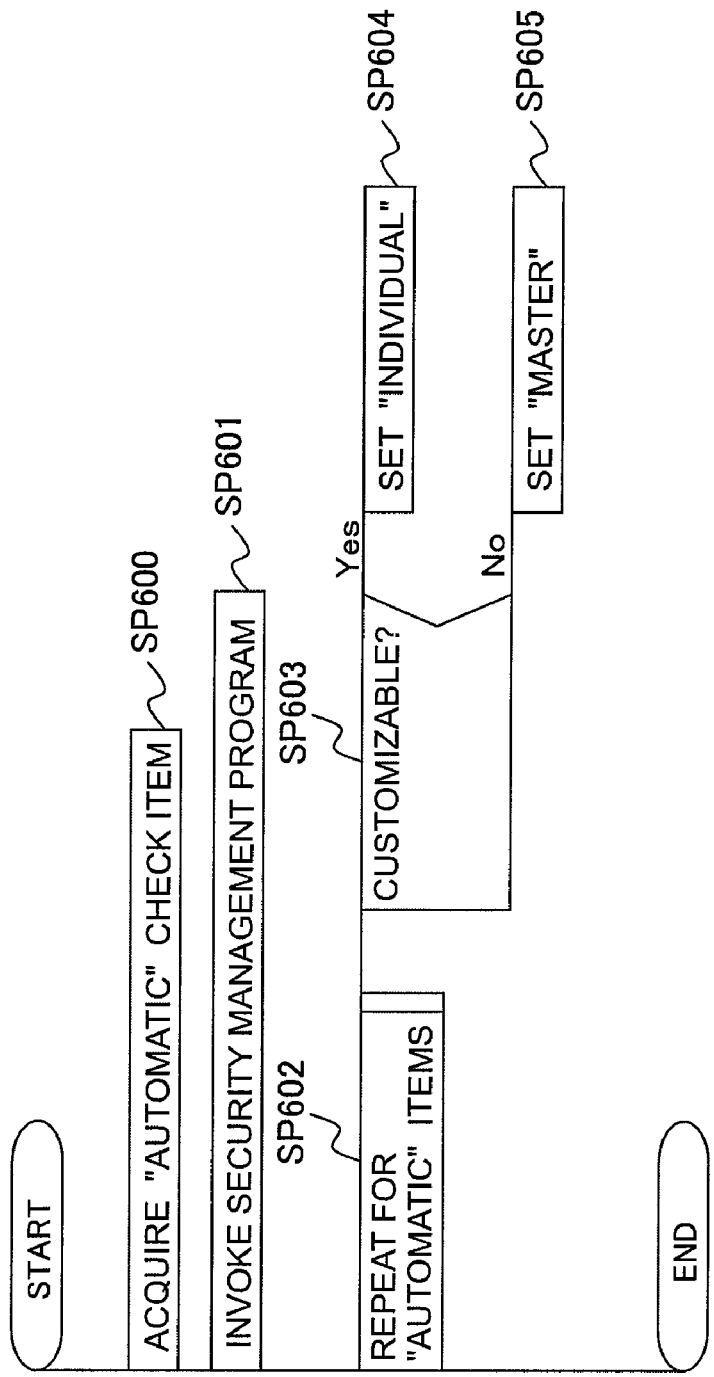
FIG. 29 is a PAD diagram showing the processing steps of a check target setting process according to the third embodiment.

FIG. 29 shows the processing steps of the check target setting process executed in accordance with the check target setting program 1000 started up in Step SP501 of FIG. 28.

The check target setting program 1000 of this embodiment first references the check policy and lists up an item having the check target "automatic" (SP600), and thereafter invokes the security management program 1002, and acquires the restricted use information of the virtual client (SP601).

Next, in Step SP602, the check target setting program 1000 repeats Steps SP603 through SP605 for the respective items having "automatic" as the check target listed in Step SP600 (SP602).

Specifically, the check target setting program 1000 references the restricted use information acquired in Step SP601, and determines whether or not the processing-targeted check item is customizable (SP603).

Then, when an affirmative result is obtained in this determination, the check target setting program 1000 sets "individual" as the check target of this check item (SP604), and when a negative result is obtained, sets "master" as the check target of this check item (SP605). For example, in the case of the check target of the check item that inquires if a password-controlled screensaver has been set, the check target setting program 1000 sets "individual" if the individual VM screensaver setting is not prohibited, and sets "master" if the individual VM screensaver setting is prohibited.

Then, the check target setting program 1000 ends the check target setting process shown in FIG. 29 when the processing of either Step SP604 or Step SP605 is complete.

In the above-mentioned network system 900 according to this embodiment, the check target set in the check policy is automatically determined and set based on system environment information, thereby making it possible to achieve an effect that facilitates check policy setting work in addition to the effect achieved in accordance with the first embodiment.

(4) Fourth Embodiment

Next, a fourth embodiment will be explained. In this embodiment, an explanation will be given using an example in which the check target set in the check policy is automatically determined based on the system environment information the same as in the third embodiment. In the third embodiment, only one check target that is shared by all the master VM may be set for one check item, but in this embodiment, it is possible to specify check targets that differ by master VM for a single check item.

Figure 30:
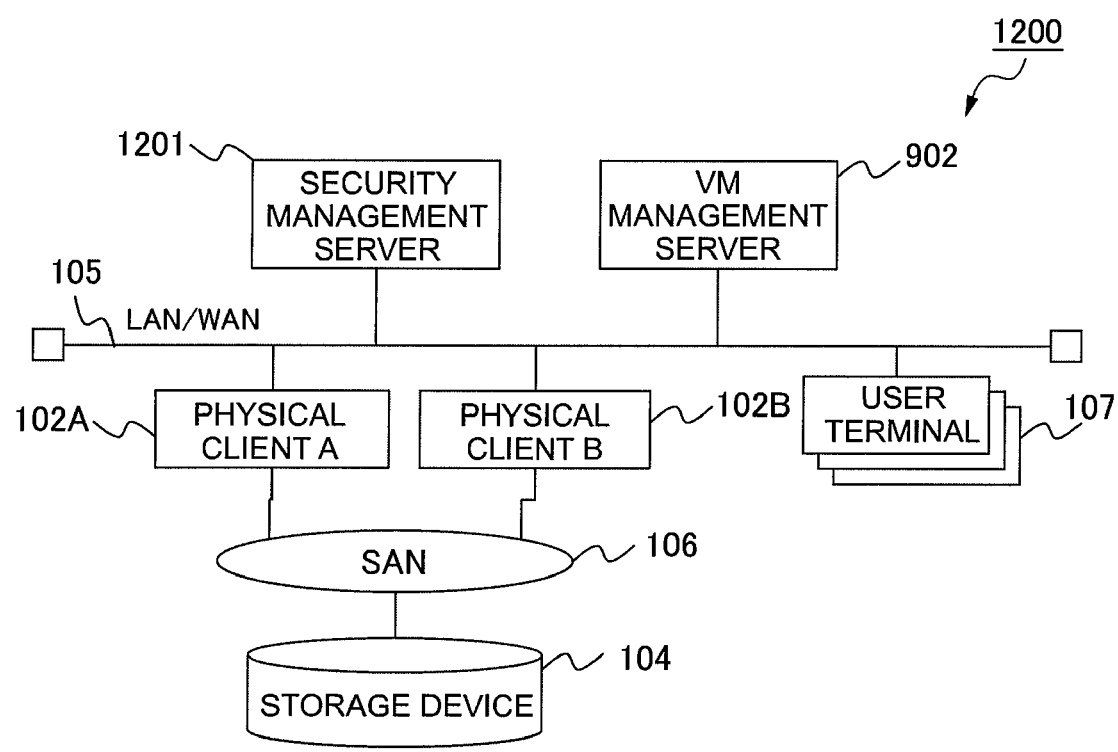
FIG. 30 is a block diagram showing the overall configuration of a network system of a fourth embodiment.

FIG. 30, in which parts corresponding to those of FIG. 24 have been assigned the same reference numerals, shows a network system 1200 according to the fourth embodiment. This network system 1200 is configured the same as the network system 900 according to the third embodiment except that the configuration of the security management server 1201 is different.

Figure 31:
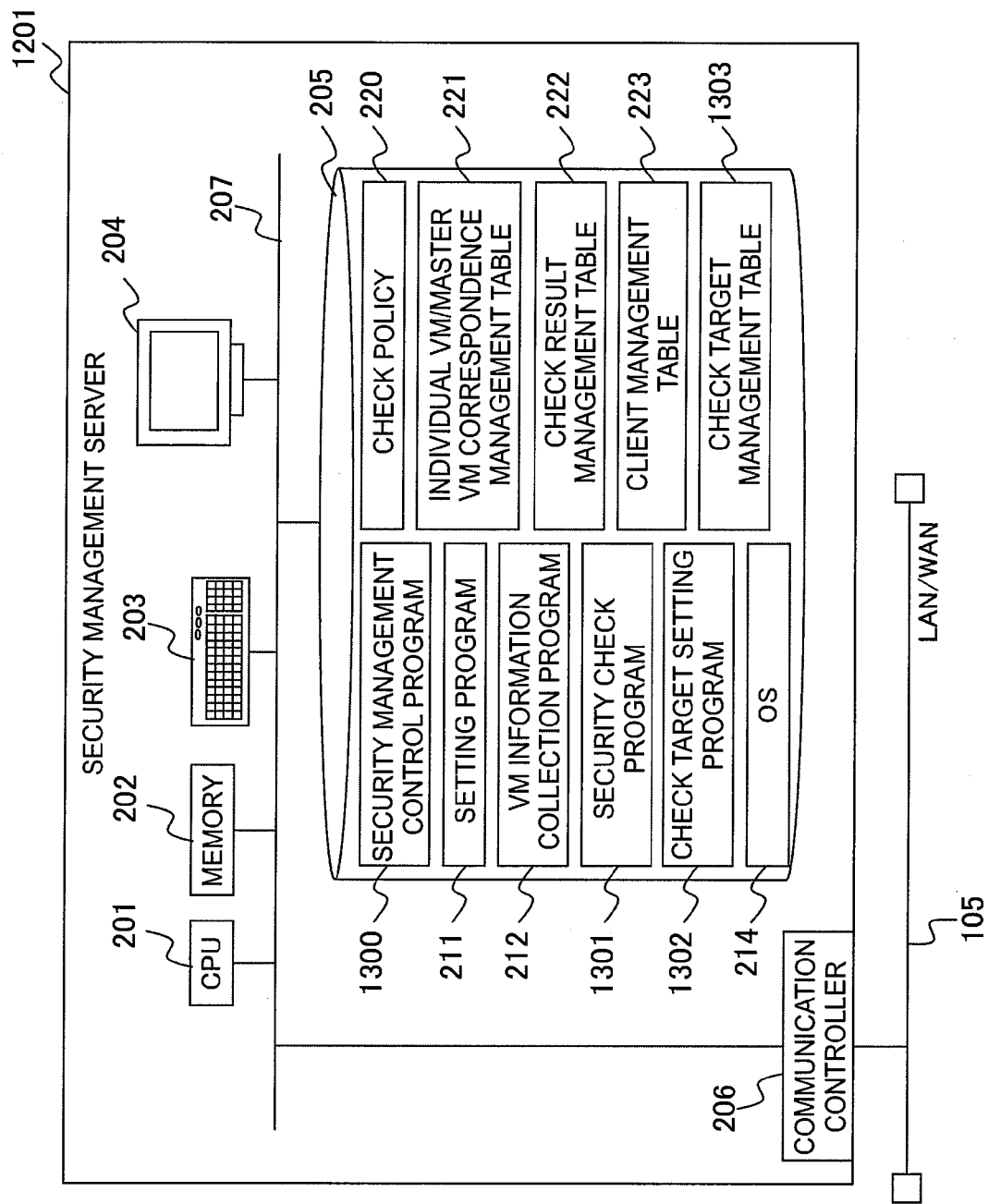
FIG. 31 is a block diagram showing the configuration of a security management server according to the fourth embodiment.

In this case, as shown in FIG. 31, in which parts corresponding to those of FIG. 26 have been assigned the same reference numerals, the security management server 1201 is configured the same as the security management server 901 according to the third embodiment except that the configurations of a security management control program 1300, a security check program 1301 and a check target setting program 1302, which are stored in the external storage device 205, are different, and that a check target management table 1303 is stored in this external storage device 205 in addition to the various programs and information described above using FIG. 2.

Furthermore, the example given below is one which references the registry information of the master VM as an example of the environment information for determining the propriety of customization. Further, the only difference in the security check program 1301 of this embodiment is that the check target information is acquired by referencing the check target management table 1303 for the item in which the check target of the check policy is set to "automatic", and as such, an explanation of the processing steps will be omitted.

The check target management table 1303 is for managing the check target of each check item respectively set for each master VM, and, as shown in FIG. 29, is configured from a machine ID column 1303A and a plurality of ID columns 1303B.

The machine IDs of the respective master VM, for which the check target of the check policy is set to "automatic", are stored in the machine ID column 1303A. The ID columns 1303B are provided corresponding to the respective check items set in the check policy, and a check target (either "master" or "individual"), which has been set in relation to the master VM for each corresponding check item, is stored in these ID columns 1303B.

Figure 33:
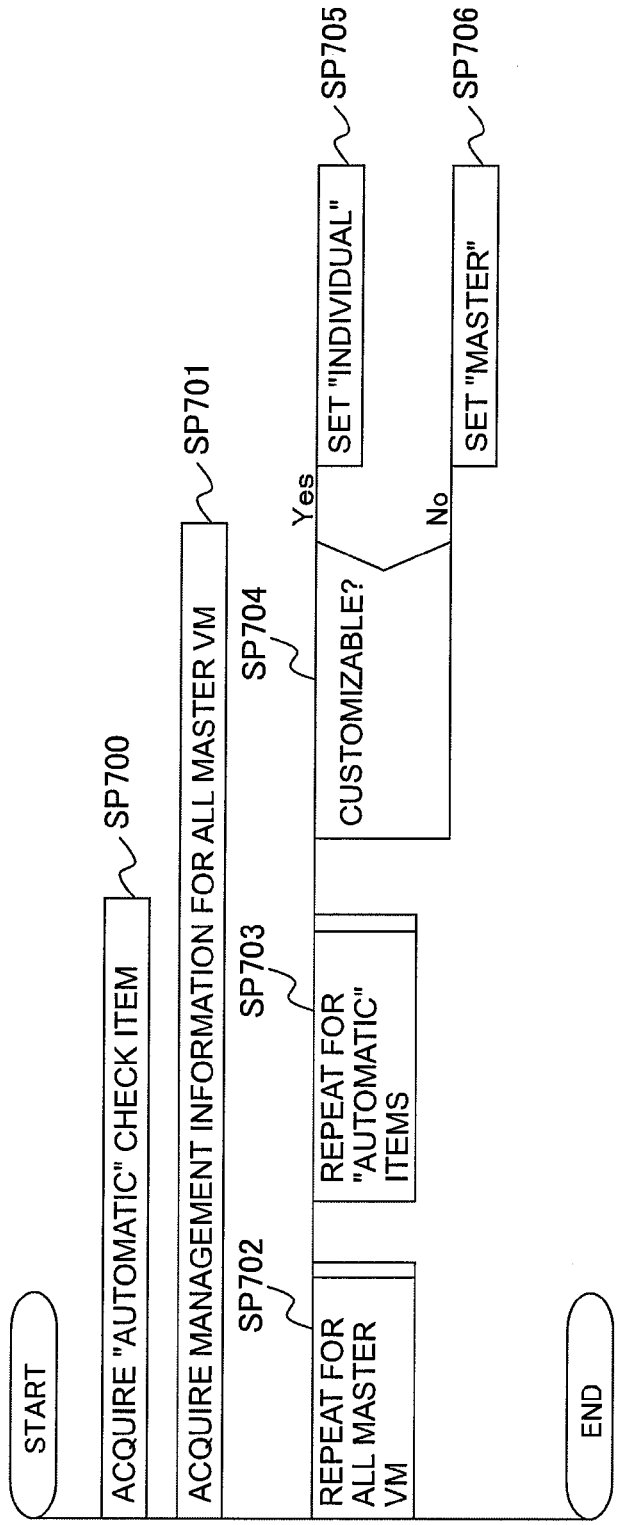
FIG. 33 is a PAD diagram showing the processing steps of a check target setting process of the fourth embodiment.

FIG. 33 shows the processing steps of the check target setting process executed in accordance with the check target setting program 1302 started up in Step SP501 of FIG. 28.

The check target setting program 1302 of this embodiment first references the check policy, and lists up the items for which the check target is "automatic" (SP700).

Next, the check target setting program 1302 references the individual VM/master VM correspondence management table 221 and the client management table 223, and acquires the management information of all the master VM (SP701).

Thereafter, the check target setting program 1302 repeats the processing of Steps SP703 through SP706 explained hereinbelow for all master VM (SP702).

Specifically, the check target setting program 1302 repeats the processing of Steps SP704 through SP706 for the respective items having "automatic" as the check target listed up in Step SP700 (Step SP703).

That is, the check target setting program 1302 references the registry information of the processing-targeted master VM, and determines if the processing-targeted item is customizable (SP704).

When an affirmative result is obtained in this determination, the check target setting program 1302 then sets "individual" in the column of the check item of this master VM in the check target management table 1303 (SP705), and when a negative result is obtained, sets "master" in the column of this check item (Step SP706).

The check target setting program 1302 then ends the check target setting process shown in FIG. 33 when the processing of either Step SP705 or Step SP706 has been completed.

According to the above-mentioned security management method of this embodiment, in addition to the effect achieved in accordance with the third embodiment, it is possible to carry out security management in more detail in order to specify check targets that differ by master VM for a single check item.

INDUSTRIAL APPLICABILITY

The present invention may be applied widely to security management devices of various configurations, which carry out security checks with respect to virtual clients on a network.

The invention claimed is:

1. A security management device for managing the security of a plurality of virtual machines including a master virtual machine and an individual virtual machine that is a copy or derivation of the master virtual machine, the security management device comprising:
    a storage device having a security check program stored thereon, and a check policy prescribing a target virtual machine of a security check item for the security check program; and
    a Central Processing Unit (CPU) configured to execute the security check program to:
    (A) when the target virtual machine of a first security check item is the master virtual machine, obtain a result of a process for the first security check item to the master virtual machine and use the result to check the first security check item of the individual virtual machine;
    (B) receive an input for changing the target virtual machine of the first security check item to the individual virtual machine;
    (C) after the reception of the input in which the target virtual machine of the first security check item has been changed to the individual virtual machine, check the first security check item of the individual virtual machine by executing the process for the first security check to the individual virtual machine and not using the result of the process for the first security check item to the master virtual machine; and
    (D) display a current check policy of the first security check item.

2. A security management device according to claim 1, wherein a change in the master virtual machine is reflected in the individual virtual machine subsequent to a rebooting, and wherein the CPU is configured to check whether the individual virtual machine has been rebooted subsequent to the change of the master virtual machine.

3. A security management device according to claim 1, wherein a priority is set in the check policy for the first security check item, and
wherein the CPU is configured to determine whether the check of the first security check item and a second security check item is to be executed in accordance with the priority.

4. A security management device according to claim 1, wherein a check period for the first security check item is set in the check policy, and
wherein the CPU is configured to preferentially execute the check of the first security check item of the individual virtual machine not being executed within the check period.

5. A security management device according to claim 1, wherein, if an operation of the individual virtual machine is suspended, the CPU is configured to decide the process of the first security check item to be executed to the individual virtual machine in accordance with a free resource capacity in a computer providing the individual virtual machine.

6. A security management device according to claim 5, wherein the check is consequent upon starting up of the individual virtual machine using another computer having a free resource.

7. A security check management device according to claim 1,
wherein the security management device is different from a computer providing the individual virtual machine.

8. A security check management device according to claim 1, wherein a target of a second security check item for the individual virtual machine is set in the check policy.

9. A security check management device according to claim 1,
wherein the storage device stores relations between the master virtual machine and the individual virtual machine.

10. A security check management device according to claim 1, wherein in (D), a check period for the first security check item is displayed in addition to information about the target of the first security check item.

11. A security check management device according to claim 1,
wherein the individual virtual machine is one of a plurality of individual virtual machines, and
wherein the target of the first security check item is common for each of the plurality of individual virtual machines.

12. A security management method for managing security of a plurality of virtual machines including a master virtual machine and an individual virtual machine that is a copy or derivation of the master virtual machine, the security management method comprising:
a operation of storing a check policy prescribing a target virtual machine of a security check item for the security check program; and
a second operation of executing a security check to:
(A) when the target virtual machine of a first security check item is the master virtual machine, obtain a result of a process for the first security check item to the master virtual machine and use the result to check the first security check item of the individual virtual machine;
(B) receive an input for changing the target virtual machine of the first security check item to the individual virtual machine;
(C) after the reception of the input in which the target virtual machine of the first security check item has been changed to the individual virtual machine, check the first security check item of the individual virtual machine by executing the process for the first security check to the individual virtual machine and not using the result of the process for the first security check item to the master virtual machine; and
(D) display a current check policy of the first security check item.

13. A security management method according to claim 12, wherein a change in the master virtual machine is reflected in the individual virtual machine subsequent to a rebooting, and
wherein, in the second operation, a check is carried out as to whether the individual virtual machine has been rebooted subsequent to the change of the master virtual machine.

14. A security management method according to claim 12, wherein a priority is set in the check policy for the first security check item, and
wherein, in another operation, a determination is made as to whether a security check of the first check item and a second check item is to be executed in accordance with the priority.

15. A security management method according to claim 12, wherein a check period for the first security check item is set in the check policy, and
wherein, in the second operation, a security check is preferentially executed for the check of the first security check item of the individual virtual machine not being executed within the check period.

16. A security management method according to claim 12, wherein, in the second step, if an operation of the individual virtual machine is suspended, the operation of the first security check item to be executed to the individual virtual machine is decided in accordance with a free resource capacity in a computer providing the individual virtual machine.

17. A non-transitory computer-readable medium having a security management program stored thereon for execution by at least one processing circuit to manage the security of a plurality of virtual machines including a master virtual machine and an individual virtual machine that is a copy or derivation of the master virtual machine, the security management program including instructions comprising:
providing a check policy prescribing a target virtual machine of a security check item for the security check program; and
(A) when the target virtual machine of a first security check item is the master virtual machine, obtain a result of a process for the first security check item to the master virtual machine and use the result for checking the first security check item of the individual virtual machine;
(B) receiving an input for changing the target virtual machine of the first security check item to the individual virtual machine;
(C) after the reception of the input in which the target virtual machine of the first security check item has been changed to the individual virtual machine, checking the first security check item of the individual virtual machine by executing the process for the first security check to the individual virtual machine and not using the result of the process for the first security check item to the master virtual machine; and (D) displaying a current check policy of the first security check item.

18. The non-transitory computer-readable medium of claim 17, wherein a target of a second security check item for the individual virtual machine is set in the check policy.

19. The non-transitory computer-readable medium of claim 17, wherein in (D), a check period for the first security check item is displayed in addition to information about the target of the first security check item.

20. The non-transitory computer-readable medium of claim 17,
wherein the individual virtual machine is one of a plurality of individual virtual machines, and
wherein the target of the first security check item is common for each of the plurality of individual virtual machines.

* * * * *